US012742026B2

(12) United States Patent
Edwards et al.

(10) Patent No.: US 12,742,026 B2
(45) Date of Patent: Sep. 22, 2026

(54) POLYMERS WITH LOW LEVELS OF VOLATILE ORGANIC COMPOUNDS AND METHODS OF MAKING SUCH POLYMERS

(71) Applicant: EXXONMOBIL CHEMICAL PATENTS INC., Baytown, TX (US)

(72) Inventors: Todd S. Edwards, League City, TX (US); Christopher G. Bauch, Seabrook, TX (US); Ranadip Ganguly, Houston, TX (US); Xiaodan Zhang, Houston, TX (US)

(73) Assignee: EXXONMOBIL CHEMICAL PATENTS INC., Baytown, TX (US)

(*) Notice: Subject to any disclaimer, the term of this patent is extended or adjusted under 35 U.S.C. 154(b) by 640 days.

(21) Appl. No.: 18/001,438

(22) PCT Filed: Jul. 12, 2021

(86) PCT No.: PCT/US2021/041228
§ 371 (c)(1),
(2) Date: Dec. 9, 2022

(87) PCT Pub. No.: WO2022/015627
PCT Pub. Date: Jan. 20, 2022

(65) Prior Publication Data

US 2023/0235105 A1 Jul. 27, 2023

Related U.S. Application Data

(60) Provisional application No. 63/052,975, filed on Jul. 17, 2020.

(51) Int. Cl.
*C08F 210/06* (2006.01)
*C08F 2/18* (2006.01)
(Continued)

(52) U.S. Cl.
CPC .............. *C08F 210/06* (2013.01); *C08F 2/18* (2013.01); *C08F 110/06* (2013.01); *C08F 210/16* (2013.01); *C08L 23/12* (2013.01)

(58) Field of Classification Search
CPC ........ C08F 2/18; C08F 110/06; C08F 210/06; C08F 210/16; C08L 23/12
See application file for complete search history.

(56) References Cited

U.S. PATENT DOCUMENTS 7,662,901 B2 2/2010 Meverden et al.
8,779,058 B2 * 7/2014 Sheard .................... C08L 23/10 525/240
(Continued)

FOREIGN PATENT DOCUMENTS

EP 2315790 B1 5/2011
WO WO-2019005261 A1 * 1/2019 ............. C08F 4/022

*Primary Examiner* — James C Goloboy
(74) *Attorney, Agent, or Firm* — Vorys, Sater, Seymour and Pease LLP

(57) ABSTRACT

Polypropylenes and impact copolymers with low organic volatiles. The impact copolymers comprising a polypropylene and within a range from 5 wt % to 40 wt % of an ethylene-propylene copolymer or rubber, by weight of the impact copolymer; wherein the polypropylene has a melt flow rate within a range from 100 g/10 min to 400 g/10 min, and the impact copolymer has a melt flow rate within a range from 15 g/10 min to 150 g/10 min; and wherein there are less than 1000 μg of oligomer per gram of impact copolymer. The polymers may be made by combining olefins with the reaction product of a solid magnesium compound and a halogen-containing titanium compound with at least one phthalic acid ester compound and at least one diether compound as internal electron donors.

17 Claims, 3 Drawing Sheets

(51) Int. Cl.

| | |
|---|---|
| ***C08F 110/06*** | (2006.01) |
| ***C08F 210/16*** | (2006.01) |
| ***C08L 23/12*** | (2006.01) |

(56) References Cited

U.S. PATENT DOCUMENTS

| | | | | |
|---|---|---|---|---|
| 9,255,166 | B2 | 2/2016 | Grein et al. | |
| 2006/0241243 | A1* | 10/2006 | Seidel | C08L 69/00 525/67 |
| 2017/0267794 | A1* | 9/2017 | Lin | C08F 210/06 |
| 2023/0295191 | A1* | 9/2023 | Gubbels | C08K 5/56 524/174 |

* cited by examiner

Dryer Vessel, cutaway

Polymer Granules Flow Direction

POLYMERS WITH LOW LEVELS OF VOLATILE ORGANIC COMPOUNDS AND METHODS OF MAKING SUCH POLYMERS

CROSS-REFERENCE OF RELATED APPLICATIONS

This application claims priority to and the benefit of U.S. Ser. No. 63/052,975, filed Jul. 17, 2020, the disclosure of which is incorporated herein by reference.

FIELD OF THE INVENTION

The present invention relates to a method for producing polypropylenes having low volatile organic compounds, while maintaining or improving stiffness and impact strength.

BACKGROUND

In polymerization of olefins such as propylene, a solid catalyst component comprising magnesium, titanium, halogen and an electron-donating compound as essential components has conventionally been known. In addition, a number of methods for polymerizing or copolymerizing olefins in the presence of a catalyst for polymerization of olefins formed of such a solid catalyst component, an organoaluminum compound and an organosilane compound have been proposed.

Among these catalysts for polymerization of olefins, it has been reported that excellent polymerization activity and stereospecificity are exhibited in a case where a solid titanium catalyst component (solid catalyst component) having an internal electron-donating compound, typical examples of which include a phthalic acid ester in particular, carried thereon; and an organoaluminum compound and at least one organosilane as a promoter.

On the other hand, in recent years, volatile organic compounds ("VOC's") such as olefin oligomers generated from polypropylene resins used in interior components for automobiles and the like have caused undesirable odors, and there has been a growing demand for a catalyst for polymerization of olefins that can readily produce a polymer of olefins that can suppress generation of VOC's.

No solid catalyst component has been reported that has a polymerization activity equivalent to or higher than that of the case using a conventional solid catalyst components and that can produce an impact copolymers ("ICP") with an excellent impact strength and a low content of olefin oligomers. What is needed is a low VOC impact copolymer, especially useful in automotive and appliance applications, and the catalyst and process to make such an impact copolymer.

Related publications include US 2020/0172641 A1; CN 102731901 B1; CN 105622809 B1; CN 105524349 B1; and CN 102875895 B1.

SUMMARY OF THE INVENTION

Disclosed herein is an impact copolymer comprising (or consisting of, or consisting essentially of) a polypropylene and within a range from 5 wt % to 40 wt % of an ethylene-propylene copolymer or rubber ("EPR"), by weight of the impact copolymer; wherein the polypropylene has a melt flow rate within a range from 100 g/10 min to 400 g/10 min, and the impact copolymer has a melt flow rate within a range from 15 g/10 min to 150 g/10 min; and wherein there are less than 1000 μg of oligomer per gram of impact copolymer.

Also disclosed is an impact copolymer, preferably as described herein, made by the process comprising (or consisting of, or consisting essentially of) combining olefins with the reaction product of a solid magnesium compound and a halogen-containing titanium compound with at least one phthalic acid ester compound and at least one diether compound as internal electron donors.

Also is a method to make an impact copolymer comprising (or consisting of, or consisting essentially of) combining a solid magnesium and halogen-containing titanium compound with propylene and hydrogen in a slurry reactor to produce a polypropylene reaction product, followed by combining ethylene and propylene with the polypropylene reaction product and hydrogen in a gas phase reactor to obtain the impact copolymer comprising a polypropylene and within a range from 5 wt % to 40 wt % of an EPR, by weight of the impact copolymer; wherein the polypropylene has a melt flow rate within a range from 100 g/10 min to 400 g/10 min, and the impact copolymer has a melt flow rate within a range from 15 g/10 min to 150 g/10 min; and wherein there are less than 1000 μg of oligomer per gram of impact copolymer. The impact copolymer thus produced and the catalyst used to make it may be described by any of the features for the inventive impact copolymer described herein.

Also is a polypropylene polymer comprising a xylene-soluble content of less than 1.5 wt %, a Flexural Modulus of at least 1700 MPa, and less than 1000 μg of oligomer per gram of polypropylene polymer.

Also is a polypropylene polymer made by combining propylene with the contact product of a solid magnesium compound and a halogen-containing titanium compound with at least one phthalic acid ester compound and at least one diether compound as internal electron donors.

DETAILED DESCRIPTION

Figure 1:
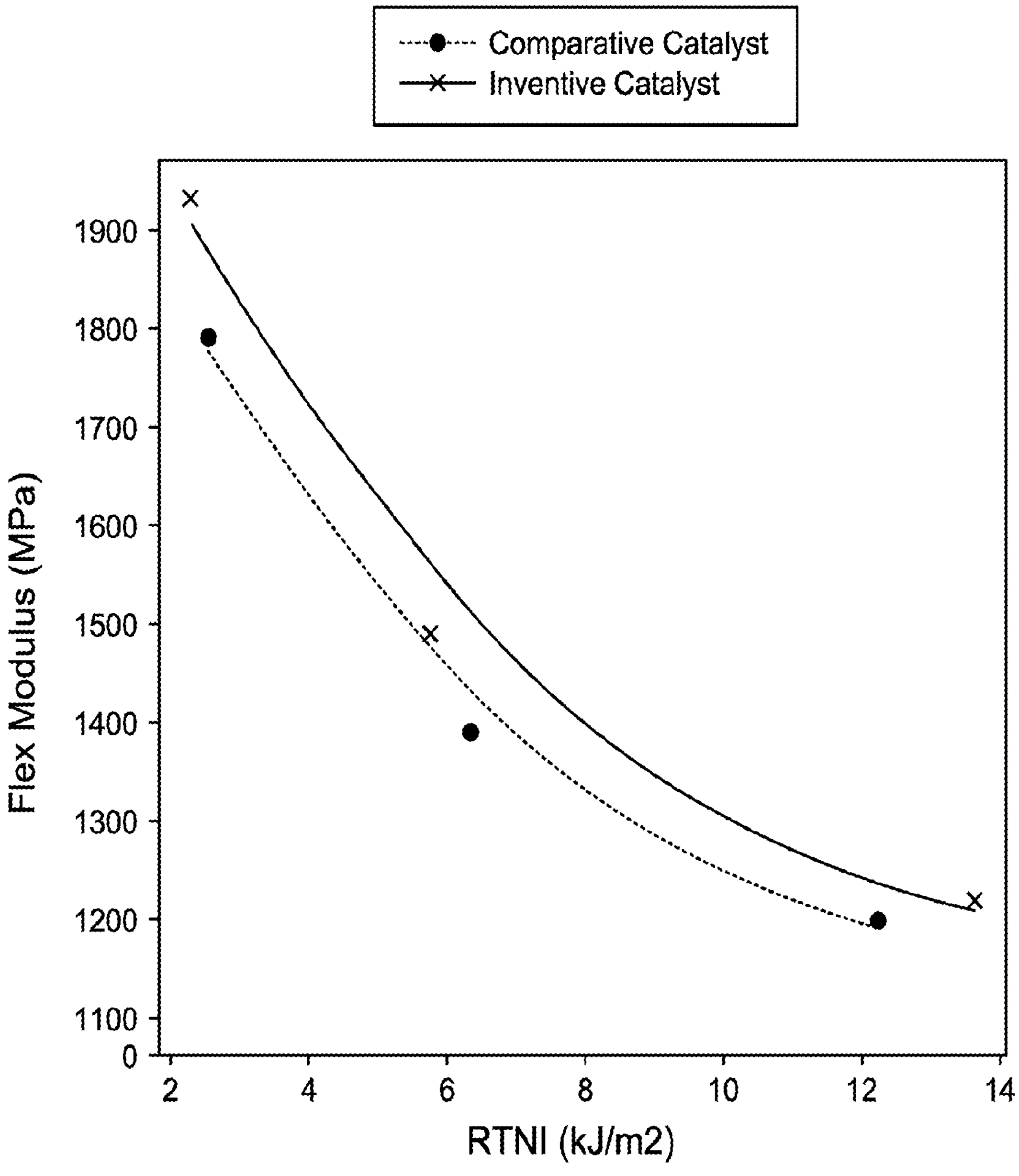
FIG. 1 is a two-dimensional plot of Flexural Modulus (stiffness) as a function of Notched Izod (impact strength) of several inventive example impact copolymers (solid line and data points) and comparative example impact copolymers (dashed line and cross data points), where the amount of EPR (dispersed phase) of the impact copolymer is different for each data point corresponding to the data in Table 1.

During the polymerization of propylene using Ziegler-Natta catalysts, volatile oligomers of propylene are produced. These undesirable by-products must be removed by expensive purging and other mechanical methods. By developing a catalyst that produces a lower amount of oligomers, the need for mechanical removal of these compounds can be reduced or eliminated. The catalysts described in this invention produce a lower amount of oligomers than catalysts containing only phthalate internal donors. By using a combination of phthalate and diether type compounds in a specific way during the preparation of the catalyst, these catalysts also give high activity and bulk density. The inventive catalysts also produce impact copolymers with increased stiffness at the same or improved impact strength.

As used herein, an "oligomer" is C5 or C6 to C21, or C22, or C24 hydrocarbon compound, preferably a saturated hydrocarbon compound. The term "volatile organic compounds" or "VOC's" is also used to refer to C5 or C6 to C21, or C22, or C24 hydrocarbon compounds, but may also include organic and heteroatom-containing organic compounds such as additive by-products from the extrusion process or other such molecules and fragments of molecules.

As used herein, an "impact copolymer" is a two-phase polypropylene comprising a matrix phase of a polypropylene ("PP") comprising within a range from 0, 0.1 to 2, or 3 wt %, by weight of the polypropylene, or ethylene or another $\alpha$-olefin, and a dispersed phase of an EPR comprising within a range from 5, or 10 wt % to 20, or 30, or 40, or 50, or 50 wt %, by weight of the EPR, of ethylene and/or another $\alpha$-olefin. Preferably, impact copolymers are made in an in situ polymerization process wherein each component is made in series-type reactors to form one component (either the PP or EPR), then the other thus forming the combination of the PP/EPR, wherein the EPR is finely dispersed in the PP matrix phase.

As used herein, the term "catalyst" refers to the solid magnesium and halogen-containing titanium compound described herein as well as the internal electron donors (1) and (2), and preferably the external electron donor(s) and organoaluminum desirable to effect polymerization of olefins to polyolefins. Compounds that include a solid magnesium and halogen-containing titanium compound with at least one internal electron donor are also referred to as "Ziegler-Natta" catalysts.

Thus provided is an impact copolymer made using solid catalyst component for polymerization of olefins is provided, the catalyst component obtained by sequentially performing the following steps:

(i) a first step of bringing one or two or more compounds selected from particular phthalic acid ester compounds, a magnesium compound and a halogen-containing titanium compound into contact with each other, thereby obtaining a first contact product (solid product);

(ii) a second step of further bringing the first contact product obtained in the above step (i) and one or two or more compounds selected from particular diether compounds into contact with each other, and then washing the obtained second contact product (first internal electron donor); and (iii) a third step of bringing the washed second contact product and a halogen-containing titanium compound into contact with each other to obtain a contact product, then washing the obtained contact product, and further bringing the washed contact product, one or two or more compounds selected from phthalic acid ester compounds represented by the general formula (1) and a halogen-containing titanium compound into contact with each other, thereby obtaining a third contact product (second internal electron donor). The combination of the solid product and internal electron donors is referred to as contact product herein. To effect olefin polymerization, an organoaluminum compound is preferably combined, as are one or more external electron donors.

More particularly, in any embodiment is an impact copolymer made using a solid catalyst component made by the steps comprising the following steps sequentially performed:

In (i) a first step of bringing one or two or more compounds selected from phthalic acid ester compounds represented by the following general formula (1), a magnesium compound and a halogen-containing titanium compound into contact with each other, thereby obtaining a first contact product:

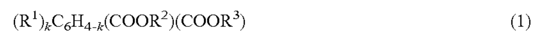

$$(R^1)_kC_6H_{4-k}(COOR^2)(COOR^3) \quad (1)$$

wherein $R^1$ represents an alkyl group having 1 to 8 carbon atoms or a halogen atom; $R^2$ and $R^3$ each represent an alkyl group having 1 to 12 carbon atoms and may be the same as or different from each other; and the number of the substituent $R^1$, k, is 0, 1 or 2, and when k is 2, a plurality of $R^1$ may be the same as or different from each other, (ii) a second step of further bringing the first contact product obtained in the step (i) and one or two or more compounds selected from diether compounds represented by the following general formula (2) into contact with each other, thereby obtaining a second contact product, and then washing the obtained second contact product:

(2)

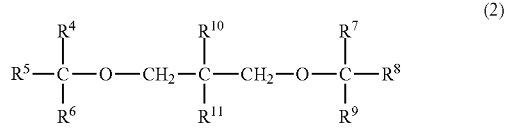

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring; and (iii) a third step of bringing the washed second contact product and a halogen-containing titanium compound into contact with each other to obtain a contact product, then washing the obtained contact product, and further bringing the washed contact product, one or two or more compounds selected from phthalic acid ester compounds represented by the above general formula (1) and a halogen-containing titanium compound into contact with each other, thereby obtaining a third contact product.

In any embodiment the solid catalyst component for polymerization of olefins comprises titanium, magnesium, halogen and an internal electron-donating compound; and the internal electron-donating compound comprises one or two or more compounds selected from phthalic acid ester compounds represented by the following general formula (1) above, and one or two or more compounds selected from diether compounds represented by the following general formula (2) above, wherein the total amount of the phthalic acid ester compounds and the diether compounds per g of the solid catalyst component for polymerization of olefins is 0.5 to 1.2 mmol; and the ratio represented by the entire molar amount of the phthalic acid ester compounds/the entire molar amount of the diether compounds is 0.5 to 1.2.

Polymerization of olefins using the inventive catalyst is also effected by the contacting the catalyst with an organoaluminum compound selected from the following general formula (3):

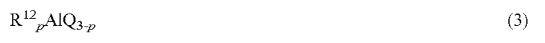

$R^{12}{}_{p}AlQ_{3-p}$ (3)

wherein p is a real number of $0<p\leq3$; $R^{12}$ represents an alkyl group having 1 to 6 carbon atoms, and when a plurality of $R^{12}$ is present, a plurality of $R^{12}$ may be the same as or different from each other; and Q represents a hydrogen atom or halogen, and when a plurality of Q is present, a plurality of Q may be the same as or different from each other; and also contacting the solid catalyst contact product with one or more external electron donors.

Note that, hereinafter, the solid catalyst component for polymerization of olefins will be referred to as a solid catalyst component, as appropriate.

In any embodiment, a solid catalyst component for polymerization of olefins that has a polymerization activity equivalent to or higher than that of the case using a solid catalyst component in which a phthalic acid ester compound or diether compound is used as an internal electron-donating compound, and that can produce impact copolymer with an excellent bulk density and a low content of olefin oligomers can be provided, and a method for producing a solid catalyst component for polymerization of olefins, a catalyst for polymerization of olefins, a method for producing a catalyst for polymerization of olefins and a method for producing a polymer of olefins can also be provided.

The method for producing a solid catalyst component for polymerization of olefins is characterized in that the following steps are preferably sequentially performed steps (i), (ii), and (iii) described herein:

In (i) a first step of bringing one or two or more compounds selected from phthalic acid ester compounds represented by the following general formula (1), a magnesium compound and a halogen-containing titanium compound into contact with each other, thereby obtaining a first contact product with the internal electron donor (1).

In (ii) a second step of further bringing the first contact product obtained in the step (i) and one or two or more compounds selected from diether compounds represented by the following general formula (2) into contact with each other, thereby obtaining a second contact product, and then washing the obtained second contact product with the internal electron donor (2).

In (iii) a third step of bringing the washed second contact product and a halogen-containing titanium compound into contact with each other to obtain a contact product, then washing the obtained contact product, and further bringing the washed contact product, one or two or more compounds selected from phthalic acid ester compounds represented by the above general formula (1) and a halogen-containing titanium compound into contact with each other, thereby obtaining a third contact product.

In any embodiment the phthalic acid ester compounds represented by the following general formula (1):

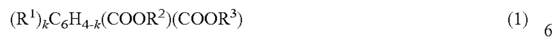

$(R^1)_kC_6H_{4-k}(COOR^2)(COOR^3)$ (1)

wherein $R^1$ is an alkyl group having 1 to 8 carbon atoms or a halogen atom.

When $R^1$ is an alkyl group having 1 to 8 carbon atoms, the alkyl group having 1 to 8 carbon atoms may be either linear or branched chain, and examples thereof include, for example, a methyl group, an ethyl group, a n-propyl group, an iso-propyl group, a n-butyl group, an iso-butyl group, a t-butyl group, a n-pentyl group, an iso-pentyl group, a neopentyl group, a n-hexyl group, a n-heptyl group and a n-octyl group.

When $R^1$ is a halogen atom, examples of the halogen atom include, for example, fluorine, chlorine, bromine and iodine. Among the above, chlorine, bromine or iodine is preferable, and chlorine or bromine is more preferable.

The number of the substituent $R^1$, k, is 0, 1 or 2, and when k is 2, a plurality of $R^1$ may be the same as or different from each other.

In any embodiment of the phthalic acid ester compounds represented by the general formula (1), $R^2$ and $R^3$ are each an alkyl group having 1 to 12 carbon atoms and may be the same as or different from each other.

The alkyl group having 1 to 12 carbon atoms may be either linear or branched chain, and examples thereof include, for example, a methyl group, an ethyl group, a n-propyl group, an iso-propyl group, a n-butyl group, an iso-butyl group, a t-butyl group, a n-pentyl group, an iso-pentyl group, a neopentyl group, a n-hexyl group, a n-heptyl group, a n-octyl group, a n-nonyl group, a n-decyl group, a n-undecyl group and a n-dodecyl group.

Examples of the phthalic acid ester compounds represented by the general formula (1) include dimethyl phthalate, diethyl phthalate, di-n-propyl phthalate, di-iso-propyl phthalate, di-n-butyl phthalate, di-iso-butyl phthalate, di-n-butyl bromophthalate, di-iso-propyl methylphthalate, di-iso-butyl diethylphthalate, ethyl n-butyl phthalate, ethyl iso-butyl phthalate, ethyl n-propyl phthalate and n-propyl n-butyl phthalate.

Among the above, diethyl phthalate, di-n-propyl phthalate, di-iso-propyl phthalate, di-n-butyl phthalate or di-iso-butyl phthalate is preferable.

In any embodiment two or more phthalic acid ester compounds may be used in combination.

In any embodiment, the diether compound is represented by the following general formula (2):

(2)

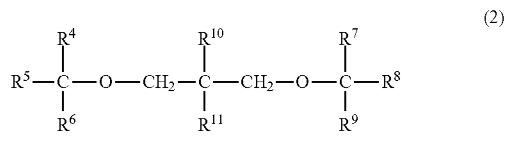

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring.

In the diether compounds represented by the general formula (2) used in the second step of the method for producing a solid catalyst component for polymerization of olefins $R^4$ to $R^9$ are each any of a hydrogen atom, a linear alkyl group having 1 to 6 carbon atoms, a branched alkyl group having 3 to 6 carbon atoms, a cycloalkyl group having 3 to 6 carbon atoms and a phenyl group. Each of the "R" groups may be the same as or different from each other.

When any of $R^4$ to $R^9$ in the general formula (2) is a linear alkyl group having 1 to 6 carbon atoms, examples of the linear alkyl group having 1 to 6 carbon atoms include, for example, a methyl group, an ethyl group, a n-propyl group, a n-butyl group, a n-pentyl group and a n-hexyl group.

When any of $R^4$ to $R^9$ in the above general formula (2) is a branched alkyl group having 3 to 6 carbon atoms, examples of the branched alkyl group having 3 to 6 carbon atoms include, for example, an iso-propyl group, an iso-butyl group, a t-butyl group, an iso-pentyl group, a neopentyl group and an iso-hexyl group.

When any of $R^4$ to $R^9$ in the general formula (2) is a cycloalkyl group having 3 to 6 carbon atoms, examples of the cycloalkyl group having 3 to 6 carbon atoms include, for example, a cyclopropyl group, a cyclobutyl group, a cyclopentyl group, a cyclohexyl group and a phenyl group.

When $R^{10}$ and $R^{11}$ in the general formula (2) are each any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other. Alternatively, $R^{10}$ and $R^{11}$ may be bonded to each other to form a ring.

When $R^{10}$ or $R^{11}$ in the general formula (2) is a linear alkyl group having 1 to 6 carbon atoms, a branched alkyl group having 3 to 6 carbon atoms or a cycloalkyl group having 3 to 6 carbon atoms, specific examples thereof include groups that are the same as those exemplified in the description of $R^4$ to $R^9$.

Examples of the diether compounds represented by the general formula (2) include 2-iso-propyl-2-iso-butyl-1,3-dimethoxypropane, 2,2-di-iso-butyl-1,3-dimethoxypropane, 2-iso-propyl-2-iso-pentyl-1,3-dimethoxypropane, 2,2-dicyclohexyl-1,3-dimethoxypropane, 2,2-bis(cyclohexylmethyl) 1,3-dimethoxypropane and 9,9-bis(methoxymethyl)fluorene.

Among the above, 2-iso-propyl-2-iso-butyl-1,3-dimethoxypropane, 2,2-di-iso-butyl-1,3-dimethoxypropane, 2-iso-propyl-2-iso-pentyl-1,3-dimethoxypropane or 9,9-bis (methoxymethyl)fluorene is preferable.

In any embodiment, two or more diether compounds may be used in combination.

Examples of the magnesium compound used in the first step include one or two or more selected from a magnesium dihalide, a dialkylmagnesium, an alkylmagnesium halide, a dialkoxymagnesium, a diaryloxymagnesium, an alkoxymagnesium halide and a fatty acid magnesium.

Among the above, a magnesium dihalide, a mixture of a magnesium dihalide and a dialkoxymagnesium, or a dialkoxymagnesium is preferable, and a dialkoxymagnesium is particularly preferable.

Examples of the dialkoxymagnesium include dimethoxymagnesium, diethoxymagnesium, dipropoxymagnesium, dibutoxymagnesium, ethoxymethoxymagnesium, ethoxypropoxymagnesium and butoxyethoxymagnesium. In addition, these dialkoxymagnesiums may be prepared by allowing magnesium metal to react with an alcohol in the presence of halogen, a halogen-containing metal compound or the like. Moreover, one of the above dialkoxymagnesiums may be used singly, or two or more of them may be used in combination.

Furthermore, in the method for producing a solid catalyst component for polymerization of olefins when a dialkoxymagnesium is used as the magnesium compound, it is preferably in a granular or powdery form, and that having an amorphous or spherical shape can be used. For example, when a dialkoxymagnesium having a spherical shape is used, the resulting polymer powder has a better particle shape and a narrower particle size distribution upon polymerization, the handling operability of the produced polymer powder upon polymerization operation is improved, and problems such as clogging caused by fine powder contained in the produced polymer powder are solved.

In any embodiment the halogen-containing titanium compound is represented by the following general formula (6):

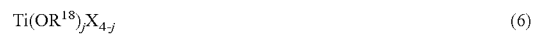

$$Ti(OR^{18})_jX_{4-j} \quad (6)$$

wherein $R^{18}$ represents a hydrocarbon group having 1 to 10 carbon atoms; when a plurality of the $OR^{18}$ groups is present, a plurality of $R^{18}$ may be the same as or different from each other; X represents a halogen group, and when a plurality of X is present, a plurality of X may be the same as or different from each other; and j is an integer of 0 or 1 to 4.

Examples of the tetravalent titanium compounds represented by the above general formula (6) include one or two or more selected from the group of an alkoxytitanium, a titanium halide and an alkoxytitanium halide.

Specific examples of the tetravalent titanium compounds described above include a titanium tetrahalide such as titanium tetrafluoride, titanium tetrachloride, titanium tetrabromide and titanium tetraiodide, and examples of the alkoxytitanium halide include an alkoxytitanium trihalide such as methoxytitanium trichloride, ethoxytitanium trichloride, propoxytitanium trichloride and n-butoxytitanium trichloride; a dialkoxytitanium dihalide such as dimethoxytitanium dichloride, diethoxytitanium dichloride, dipropoxytitanium dichloride and di-n-butoxytitanium dichloride; a trialkoxytitanium halide such as trimethoxytitanium chloride, triethoxytitanium chloride, tripropoxytitanium chloride and tri-n-butoxytitanium chloride.

Among the above, a halogen-containing titanium compound is preferable, a titanium tetrahalide such as titanium tetrachloride, titanium tetrabromide and titanium tetraiodide is particularly preferable, and titanium tetrachloride is most preferable.

One of these titanium compounds may be used singly, or two or more of them may be used in combination. Furthermore, these tetravalent titanium compounds represented by the general formula (6) may be diluted in a hydrocarbon compound, a halogenated hydrocarbon compound or the like for use.

In the first step, it is preferable that the treatment of bringing the phthalic acid ester compounds, the magnesium compound and the halogen-containing titanium compound into contact be carried out in the presence of an inert organic solvent.

As the inert organic solvent described above, an inert organic solvent that is liquid at ordinary temperature (20° C.) and has a boiling point of 50 to 150° C. is preferable; an aromatic hydrocarbon compound or saturated hydrocarbon compound that is liquid at ordinary temperature and has a boiling point of 50 to 150° C. is more preferable; and one or two or more selected from linear hydrocarbon, branched aliphatic hydrocarbon, alicyclic hydrocarbon and aromatic hydrocarbon that are liquid at ordinary temperature and have boiling points of 50 to 150° C. are still more preferable.

Specific examples of the inert organic solvent described above include one or more selected from a linear aliphatic hydrocarbon compound such as hexane, heptane and decane; a branched aliphatic hydrocarbon compound such as methylheptane; an alicyclic hydrocarbon compound such as cyclohexane, methylcyclohexane and ethylcyclohexane; an aromatic hydrocarbon compound such as toluene, xylene and ethylbenzene; and the like.

Among the inert organic solvents described above, an aromatic hydrocarbon compound that is liquid at ordinary temperature and has a boiling point of 50 to 150° C. is suitable because it can improve the activity of the solid catalyst component to be obtained and can improve the stereoregularity of the polymer to be obtained.

In the method for producing a solid catalyst component for polymerization of olefins, the phthalic acid ester compounds, the magnesium compound and the halogen-containing titanium compound can be brought into contact in the first step by mixing them in the presence of the inert organic solvent, as appropriate.

In the first step, the phthalic acid ester compounds, the magnesium compound and the halogen-containing titanium compound are brought into contact, and are allowed to react, as appropriate.

The temperature upon the contact described above is preferably −20 to 60° C., more preferably −20 to 40° C., still more preferably −10 to 30° C., and further preferably −10 to 20° C. In addition, the contact time is preferably 1 minute or longer, more preferably 10 minutes or longer, still more preferably 30 minutes to 6 hours, further preferably 30 minutes to 5 hours, and even further preferably 1 to 4 hours.

In the first step, upon bringing the phthalic acid ester compounds, the magnesium compound and the halogen-containing titanium compound into contact, the amount of the halogen-containing titanium compound to be used relative to 1 mol of the magnesium compound is preferably 0.5 to 100 mol, more preferably 1 to 50 mol, and still more preferably 1 to 10 mol.

In the first step, upon bringing the phthalic acid ester compounds, the magnesium compound and the halogen-containing titanium compound into contact, the amount of the phthalic acid ester compounds to be used relative to 1 mol of the magnesium compound is preferably 0.01 to 10 mol, more preferably 0.01 to 1 mol, and still more preferably 0.02 to 0.6 mol.

In addition, when an inert organic solvent is used in the first step, the amount of the inert organic solvent to be used relative to 1 mol of the magnesium compound is preferably 0.001 to 500 mol, more preferably 0.5 to 100 mol, and still more preferably 1 to 20 mol.

In the first step, it is preferable that the contact of each component be carried out by stirring them in a vessel equipped with a stirrer, under an inert gas atmosphere and under conditions from which moisture and the like have been removed.

In the method for producing a solid catalyst component for polymerization of olefins the first contact product obtained in the first step and the diether compounds are brought into contact, thereby obtaining the second contact product in the second step.

In the second step, the diether compounds can be suitably brought into contact by mixing in the presence of an inert organic solvent that is the same as that exemplified in the first step, as appropriate.

Conditions under which each component is brought into contact and is allowed to react as appropriate in the second step are not particularly limited, but the temperature upon the contact described above is preferably 60 to 200° C., more preferably 60 to 160° C., still more preferably 80 to 140° C., and further preferably 80 to 120° C. In addition, the contact time is preferably 1 minute or longer, more preferably 10 minutes or longer, still more preferably 30 minutes to 6 hours, further preferably 30 minutes to 5 hours, and even further preferably 1 to 4 hours.

In the second step, upon bringing the first contact product obtained in the first step into contact with the diether compounds, the molar ratio of the amount of the diether compounds to be used to 1 mol of the magnesium compound (added in the first step)(the molar amount of the diether compounds/the molar amount of the magnesium compound) is preferably 0.001 to 10, more preferably 0.002 to 1, and still more preferably 0.003 to 0.6.

In addition, in the second step, upon bringing the first contact product obtained in the first step into contact with the diether compounds, the molar ratio of the amount of the diether compounds to be used to 1 mol of the phthalic acid ester compounds (added in the first step) (the molar amount of the diether compounds/the molar amount of the phthalic acid ester compounds) is preferably 0.01 to 0.9, more preferably 0.01 to 0.6, and still more preferably 0.02 to 0.4.

When the ratio represented as the molar amount of the diether compounds/the molar amount of the phthalic acid ester compounds is within the range described above, it becomes easier to suppress excessive formation of complex compounds formed of the diether compounds and the halogen-containing titanium compound, and upon polymerizing olefins using the obtained solid catalyst component, the polymerization activity and the stereoregularity can be readily improved.

In addition, when an inert organic solvent is used in the second step, the amount of the inert organic solvent to be used relative to 1 mol of the magnesium compound (added in the first step) is preferably 0.001 to 500 mol, more preferably 0.5 to 100 mol, and still more preferably 1 to 20 mol.

Note that, in the method for producing a solid catalyst component for polymerization, in consideration of the efficiency and the like of the reaction, it is preferable that the magnesium compound be added to the reaction system in the first step in the entirety of the required amount, and it is preferable that the magnesium compound not be added to the reaction system in the second step.

In the second step, it is preferable that the contact of each component be carried out by stirring them in a vessel equipped with a stirrer, under an inert gas atmosphere and under conditions from which moisture and the like have been removed.

After the contact treatment described above is completed, it is preferable to leave the reaction solution to stand and remove the supernatant as appropriate to make it wet (slurry-like), or to further dry it by hot air drying or the like and then carry out a washing treatment.

In addition, in the second step, it is preferable not to use a halogen-containing titanium compound since the halogen-containing titanium compound added in the first step is sufficiently present.

In the second step, after the contact treatment described above is completed, the obtained reaction product is subjected to a washing treatment.

The washing treatment described above is normally carried out using a washing liquid.

Examples of the washing liquid may include those that are the same as the inert organic solvents described above, and one or more selected from a linear aliphatic hydrocarbon compound that is liquid at ordinary temperature and has a boiling point of 50 to 150° C., such as hexane, heptane and decane; a cyclic aliphatic hydrocarbon compound that is liquid at ordinary temperature and has a boiling point of 50 to 150° C., such as methylcyclohexane and ethylcyclohexane; an aromatic hydrocarbon compound that is liquid at ordinary temperature and has a boiling point of 50 to 150°

C., such as toluene, xylene, ethylbenzene and ortho-dichlorobenzene; and the like are preferable.

By using the washing liquid described above, byproducts and impurities can be readily dissolved and removed from the reaction products.

In the method for producing a solid catalyst component for polymerization of olefins it is preferable to carry out the washing treatment in the second step at a temperature of 0 to 150° C., more preferable to carry out the washing treatment at a temperature of60 to 150° C., still more preferable to carry out the washing treatment at a temperature of 80 to 130° C., further preferable to carry out the washing treatment at a temperature of 90 to 130° C., and even further preferable to carry out the washing treatment at a temperature of 90 to 120° C.

In the method for producing a solid catalyst component for polymerization of olefins, it is preferable that the washing treatment be carried out by adding a desired amount of the washing liquid to the reaction product, stirring the mixture, and then removing the liquid phase by the filtration method or decantation method.

In addition, as will be mentioned below, when the number of times of washing is multiple times (two or more times), the reaction product may be subjected to the next step as it is without removing the last washing liquid added to the reaction product.

In the second step, the amount of the washing liquid to be used is preferably 1 to 500 mL, more preferably 3 to 200 mL, and still more preferably 5 to 100 mL per g of the second contact product.

The number of times of washing may be multiple times, and the number of times of washing is preferably 1 to 20 times, more preferably 2 to 15 times, and still more preferably 2 to 10 times.

Even when the number of times of washing is multiple times, it is preferable to use the washing liquid at the amount mentioned above for every washing.

In the method for producing a solid catalyst component for polymerization of olefins by bringing each component into contact and then subjecting them to the washing treatment in the second step, impurities remaining in the second contact product, such as unreacted raw material components and reaction byproducts (such as an alkoxytitanium halide and a titanium tetrachloride-carboxylic acid complex) can be removed.

After the reaction described above is completed, the suspension after the washing treatment may be left to stand and the supernatant was removed to make the suspension wet (slurry-like) as appropriate, or the resultant may be further dried by hot air drying or the like, or the suspension may be subjected to a third step as is in the state of the suspension. When the suspension is subjected to the third step as is in the state of the suspension, the drying treatment can be omitted and addition of an inert organic solvent in the third step can also be omitted.

In the method for producing a solid catalyst component for polymerization of olefins a third step of bringing the washed second contact product described above and a halogen-containing titanium compound into contact with each other to obtain a contact product, then washing the obtained contact product, and further bringing the washed contact product, one or two or more compounds selected from phthalic acid ester compounds represented by the above general formula (1) and a halogen-containing titanium compound into contact with each other, thereby obtaining a third contact product is performed.

In the method for producing a solid catalyst component for polymerization of olefins the details of the phthalic acid ester compounds represented by the general formula (1) and the halogen-containing titanium compound to be brought into contact with the washed second contact product described above are as mentioned above.

The phthalic acid ester compounds and the halogen-containing titanium compound to be brought into contact in the third step may each be the same as or different from those used in the first step.

Conditions under which the halogen-containing titanium compound is brought into contact in the third step are not particularly limited, and specific examples thereof may include contact conditions that are the same as those in the first step.

In the third step, upon bringing the washed second contact product into contact with the halogen-containing titanium compound, thereby obtaining a contact product, the amount of the halogen-containing titanium compound to be used relative to 1 mol of the magnesium compound (added in the first step) is preferably 0.5 to 100 mol, more preferably 1 to 50 mol, and still more preferably 1 to 10 mol.

When an inert organic solvent is used in the third step upon bringing the washed second contact product into contact with the halogen-containing titanium compound, thereby obtaining a contact product, the amount of the inert organic solvent to be used relative to 1 mol of the magnesium compound (added in the first step) is preferably 0.001 to 500 mol, more preferably 0.5 to 100 mol, and still more preferably 1 to 20 mol.

In the third step, upon bringing the washed contact product, the phthalic acid ester compounds and the halogen-containing titanium compound into contact with each other, conditions under which the phthalic acid ester compounds and the halogen-containing titanium compound are brought into contact are not particularly limited, and specific examples thereof may include contact conditions that are the same as those in the first step.

In the third step, upon bringing the washed contact product described above into contact with the phthalic acid ester compounds, thereby allowing them to react as appropriate, the ratio of the amount of the phthalic acid ester compounds to be used to 1 mol of the magnesium compound (added in the first step) (the molar amount of the phthalic acid ester compounds/the molar amount of the magnesium compound) is preferably 0.001 to 10, more preferably 0.002 to 1, and still more preferably 0.003 to 0.6.

In addition, in the third step, upon bringing the washed contact product described above into contact with the phthalic acid ester compounds, the molar ratio of the amount of the phthalic acid ester compounds to be used added in the third step to 1 mol of the phthalic acid ester compounds added in the first step (the molar amount of the phthalic acid ester compounds added in the third step/the molar amount of the phthalic acid ester compounds added in the first step) is preferably 0.01 to 0.9, more preferably 0.01 to 0.6, and still more preferably 0.02 to 0.4.

When the ratio represented as the molar amount of the phthalic acid ester compounds added in the third step/the molar amount of the phthalic acid ester compounds added in the first step is within the range described above, it becomes easier to suppress excessive formation of complex compounds formed of the phthalic acid ester compounds added in the third step and the halogen-containing titanium compound, and upon polymerizing olefins using the obtained solid catalyst component, the polymerization activity and the stereoregularity of the obtained polymer can be readily improved.

In addition, it is preferable that the molar amount of the phthalic acid ester compounds used in the third step be less than the molar amount of the phthalic acid ester compounds used in the first step and be the same as or less than the molar amount of the diether compounds used in the second step. Most preferably the following relationship is satisfied: the molar amount of the phthalic acid ester compounds used in the first step is greater than the molar amount of the diether compounds used in the second step which is equal to or greater than the molar amount of the phthalic acid ester compounds used in the third step.

When an inert organic solvent is used in the third step upon bringing the washed contact product described above into contact with the phthalic acid ester compounds and the halogen-containing titanium compound, thereby obtaining a third contact product, the amount of the inert organic solvent to be used relative to 1 mol of the magnesium compound (added in the first step) is preferably 0.001 to 500 mol, more preferably 0.5 to 100 mol, and still more preferably 1 to 20 mol.

In addition, as mentioned above, in the method for producing a solid catalyst component for polymerization of olefins, in consideration of the efficiency and the like of the reaction, it is preferable that the magnesium compound be added to the reaction system in the first step in the entirety of the required amount, and it is preferable that the magnesium compound not be added to the reaction system in the third step.

In the method for producing a solid catalyst component for polymerization of olefins by dividing the entire amount of the halogen-containing titanium compound to be used for, for example, the first and third steps, and bringing it to contact part by part, the halogen-containing titanium compound, which can produce a polymer exhibiting high stereoregularity, can be introduced into the solid catalyst component with high efficiency.

In the method for producing a solid catalyst component for polymerization of olefins it is preferable to carry out the contact treatment such that the total amount of the phthalic acid ester compounds and the diether compounds per g of the solid catalyst component for polymerization of olefins to be obtained is 0.5 to 1.2 mmol, more preferable to carry out the contact treatment such that the total amount is 0.6 to 1.2 mmol, and still more preferable to carry out the contact treatment such that the total amount is 0.8 to 1.2 mmol.

In the method for producing a solid catalyst component for polymerization of olefins the ratio represented by the entire amount (molar amount) of the phthalic acid ester compounds to be used/the entire amount (molar amount) of the diether compounds to be used is preferably 0.5 to 1.2, more preferably 0.5 to 1.0, and still more preferably 0.5 to 0.8.

In the method for producing a solid catalyst component for polymerization of olefins in each step, an additional internal electron-donating compound other than the phthalic acid ester compounds represented by the general formula (1) and the diether compounds represented by the general formula (2) may be used.

Examples of such an additional internal electron-donating compound include an acid halide, an acid amide, a nitrile, an acid anhydride, and an organic acid ester other than the phthalic acid ester compounds such as a succinic acid ester, a maleic acid ester, a malonic acid ester, a glutaric acid ester, a cyclohexanedicarboxylic acid ester and a cyclohexenedicarboxylic acid ester.

One of such additional electron-donating compounds may be used singly, or two or more of them may be used in combination.

The internal electron-donating compound used in the method for producing a solid catalyst component for polymerization of olefins acts as an electron-donating compound upon preparing the solid catalyst component for polymerization of olefins.

In the method for producing a solid catalyst component for polymerization of olefins a polysiloxane may be used in combination. When the polysiloxane is used, the stereoregularity or the crystallinity of the produced polymer can be improved, and furthermore, fine powder of the produced polymer can be reduced.

In the production method it is preferable that the solid catalyst component for polymerization of olefins obtained by performing the third step be made into a powdered solid component by removing the residual solvent until the weight ratio to the solid catalyst component becomes ⅓ or less, preferably 1/20 to ⅙, and that fine powder with a particle diameter of 11 μm or less mixed in the powdered solid component be removed by means of airflow classification or the like.

Specific examples of the method for producing a solid catalyst component for polymerization of olefins include a method for obtaining a solid catalyst component for polymerization of olefins by sequentially performing the following steps:

- a first step of charging a vessel with phthalic acid ester compounds, a dialkoxymagnesium, a titanium halide, and one or two or more hydrocarbon solvents selected from a linear hydrocarbon or branched aliphatic hydrocarbon, an alicyclic hydrocarbon and an aromatic hydrocarbon and mixing them with a stirrer or the like, and bringing them into contact with each other, thereby obtaining a first contact product;
- a second step of charging the vessel containing the first contact product with diether compounds and one or two or more hydrocarbon solvents selected from a linear hydrocarbon or branched aliphatic hydrocarbon, an alicyclic hydrocarbon and an aromatic hydrocarbon and mixing them with a stirrer or the like, and bringing them into contact with each other, thereby obtaining a second contact product, and then washing this second contact product with one or two or more hydrocarbon solvents selected from a linear hydrocarbon or branched aliphatic hydrocarbon, an alicyclic hydrocarbon and an aromatic hydrocarbon; and
- a third step of charging the vessel containing the washed second contact product with a halogen-containing titanium compound, thereby obtaining a contact product, then washing the obtained contact product, further charging phthalic acid ester compounds, a titanium halide and one or two or more hydrocarbon solvents selected from a linear hydrocarbon or branched aliphatic hydrocarbon, an alicyclic hydrocarbon and an aromatic hydrocarbon to the washed contact product and mixing them with a stirrer or the like, bringing them into contact with each other, thereby obtaining a third contact product, and then washing this third contact product with one or two or more hydrocarbon solvents selected from a linear hydrocarbon or branched aliphatic hydrocarbon, an alicyclic hydrocarbon and an aromatic hydrocarbon.

In the method for producing a solid catalyst component for polymerization of olefins it is presumed that, by using the phthalic acid ester compounds in the first and third steps and using the diether compounds in the second step, the ratio represented by the entire molar amount of the phthalic acid ester compounds/the entire molar amount of the diether compounds in the solid catalyst component for polymerization of olefins to be obtained can be readily controlled within the range, which will be mentioned below, and each of the phthalic acid ester compounds and diether compounds in the solid catalyst component for polymerization of olefins can be readily carried in an optimal amount at an optimal location on a carrier.

As a result, by using the solid catalyst component for polymerization of olefins obtained by the production method upon forming a polymer of olefins, active species that are capable of producing a polymer of olefins with high stereoregularity and a low content of olefin oligomers can be formed with high efficiency.

For this reason, according to the production method a solid catalyst component for polymerization of olefins that has a polymerization activity equivalent to or higher than that of the case using a solid catalyst component in which a phthalic acid ester compound or diether compound is used as an internal electron-donating compound, and that can produce impact copolymer with an excellent bulk density and a low content of olefin oligomers can be provided.

Through the production method a solid catalyst component for polymerization of olefins which will be mentioned below, can be obtained. The details of the solid catalyst component for polymerization of olefins obtained through the production method are as mentioned below.

In any embodiment, a method for producing a solid catalyst component for polymerization of olefins that has a polymerization activity equivalent to or higher than that of the case using a solid catalyst component in which a phthalic acid ester compound or diether compound is used as an internal electron-donating compound, and that can produce impact copolymer with an excellent bulk density and a low content of olefin oligomers can be provided.

The solid catalyst component for polymerization of olefins comprises, as essential components, magnesium, titanium, halogen, and the phthalic acid ester compounds represented by the above general formula (1) and the diether compounds represented by the above general formula (2), which are each an electron-donating compound.

In the solid catalyst component for polymerization of olefins examples of the halogen that is included along with magnesium, titanium and the electron-donating compound include, for example, fluorine, chlorine, bromine and iodine. Among the above, chlorine, bromine or iodine is preferable, and chlorine or iodine is more preferable.

In addition, the contents of titanium, magnesium, halogen, the phthalic acid ester compounds and the diether compounds in the solid catalyst component for polymerization of olefins are not particularly specified as long as the effects of the present invention are achieved.

In the solid catalyst component for polymerization of olefins the total amount of the phthalic acid ester compounds and the diether compounds per g of the solid catalyst component for polymerization of olefins is preferably 0.5 to 1.2 mmol, more preferably 0.6 to 1.2 mmol, and still more preferably 0.8 to 1.2 mmol.

When the total amount of the phthalic acid ester compounds and the diether compounds per g of the solid catalyst component for polymerization of olefins is within the range described above, an optimal amount of titanium can be immobilized on the surface of a carrier for maintaining the catalytic activity at a high level.

In the solid catalyst component for polymerization of olefins the ratio represented by the entire molar amount of the phthalic acid ester compounds/the entire molar amount of the diether compounds is preferably 0.5 to 1.2, more preferably 0.5 to 1.0, and still more preferably 0.5 to 0.8.

In the solid catalyst component for polymerization of olefins when the ratio represented by the entire molar amount of the phthalic acid ester compounds/the entire molar amount of the diether compounds is within the range described above, each of the phthalic acid ester compounds and diether compounds is carried in an optimal amount at an optimal location on a carrier. By using such a solid catalyst component for polymerization of olefins, upon forming a polymer of olefins, active species that are capable of producing a polymer of olefins with high stereoregularity and a low content of olefin oligomers can be formed with high efficiency.

For this reason, a solid catalyst component for polymerization of olefins that has a polymerization activity equivalent to or higher than that of the case using a solid catalyst component in which a phthalic acid ester compound or diether compound is used as an internal electron-donating compound, and that can produce impact copolymer with an excellent bulk density and a low content of olefin oligomers can be provided.

In the solid catalyst component for polymerization of olefins the content of titanium is preferably 0.1 to 10 wt %, more preferably 0.5 to 8 wt %, and still more preferably 1 to 8 wt % by weight of the whole solid catalyst.

In the solid catalyst component for polymerization of olefins the content of magnesium is preferably 10 to 70 wt %, more preferably 10 to 50 wt %, still more preferably 15 to 40 wt %, and further preferably 15 to 25 wt % by weight of the whole solid catalyst.

In the solid catalyst component for polymerization of olefins the content of halogen is preferably 20 to 84.2 wt %, more preferably 30 to 80 wt %, still more preferably 40 to 75 wt %, and further preferably 45 to 75 wt % by weight of the whole solid catalyst.

In the solid catalyst component for polymerization of olefins the content of the phthalic acid ester compounds is preferably 3.3 to 40.9 wt %, more preferably 3.8 to 30.1 wt %, and still more preferably 3.8 to 21.4 wt % by weight of the whole solid catalyst.

In the solid catalyst component for polymerization of olefins the content of the diether compounds is preferably 2.4 to 20 wt %, more preferably 3 to 18 wt %, and still more preferably 4 to 17 wt % by weight of the whole solid catalyst.

In any embodiment, a solid catalyst component for polymerization of olefins that has a polymerization activity equivalent to or higher than that of the case using a solid catalyst component in which a phthalic acid ester compound or diether compound is used as an internal electron-donating compound, and that can produce impact copolymer with an excellent bulk density and a low content of olefin oligomers can be provided.

In any embodiment the catalyst for polymerization of olefins further comprises the contact product for polymerization of olefins (the solid magnesium and halogen-containing titanium compound and two internal donors) and one or two or more organoaluminum compounds selected from the following general formula (3):

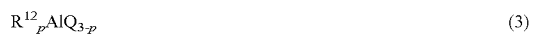

$$R^{12}_{p}AlQ_{3-p} \quad (3)$$

wherein p is a real number of $0<p\leq 3$; $R^{12}$ represents an alkyl group having 1 to 6 carbon atoms, and when a plurality of $R^{12}$ is present, a plurality of $R^{12}$ may be the same as or different from each other; and Q represents a hydrogen atom or halogen, and when a plurality of Q is present, a plurality of Q may be the same as or different from each other.

Specific examples of such organoaluminum compounds include one or two or more selected from a trialkylaluminum such as triethylaluminum, triisopropylaluminum, tri-n-butylaluminum, tri-n-hexylaluminum and triisobutylaluminum; an alkylaluminum halide such as diethylaluminum chloride and diethylaluminum bromide; and diethylaluminum hydride. One or two or more selected from an alkylaluminum halide such as diethylaluminum chloride; and a trialkylaluminum such as triethylaluminum, tri-n-butylaluminum and triisobutylaluminum are preferable, and one or two or more selected from triethylaluminum and triisobutylaluminum are more preferable.

The catalyst for polymerization of olefins further comprise at least one external electron donor along with solid contact product for polymerization of olefins and the organoaluminum compounds. Examples of the external electron donor include an organic compound that contains an oxygen atom and silicon and/or nitrogen atom. Exemplary organosilane compounds useful as external electron donors for the inventive catalysts are represented by the following general formula (4):

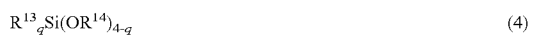

$$R^{13}_{q}Si(OR^{14})_{4-q} \quad (4)$$

wherein $R^{13}$ represents any of an alkyl group having 1 to 12 carbon atoms, a vinyl group, an allyl group, an aralkyl group, a cycloalkyl group having 3 to 12 carbon atoms, a phenyl group, an alkylamino group having 1 to 12 carbon atoms and a dialkylamino group having 1 to 12 carbon atoms; q is an integer of $0\leq q\leq 3$ and when q is 2 or more, a plurality of $R^3$ may be the same as or different from each other; and $R^{14}$ represents an alkyl group having 1 to 4 carbon atoms, a cycloalkyl group having 3 to 6 carbon atoms, a phenyl group, a vinyl group, an allyl group or an aralkyl group, and when a plurality of $R^{14}$ is present, a plurality of $R^{14}$ may be the same as or different from each other. The external electron donor may also be selected from organosilane compounds represented by the following general formula (5):

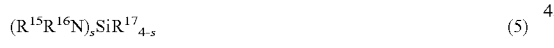

$$(R^{15}R^{16}N)_{s}SiR^{17}_{4-s} \quad (5)$$

wherein $R^{15}$ and $R^{16}$ each represent a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms or an aryl group, and may be the same as or different from each other, or may be bonded to each other to form a ring; $R^{17}$ represents a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group, an aryloxy group and a derivative thereof, and when a plurality of $R^{17}$ is present, a plurality of $R^{17}$ may be the same as or different from each other; and s is an integer of 1 to 3, and a plurality of the $R^{15}R^{16}N$ groups is present, a plurality of the $R^{15}R^{16}N$ groups may be the same as or different from each other.

Examples of the organosilane compounds represented by the general formula (4) and the general formula (5) may include a phenylalkoxysilane, an alkylalkoxysilane, a phenylalkylalkoxysilane, a cycloalkylalkoxysilane, an alkyl(cycloalkyl)alkoxysilane, an (alkylamino)alkoxysilane, an alkyl(alkylamino)alkoxysilane, a cycloalkyl(alkylamino) alkoxysilane, a tetraalkoxysilane, a tetrakis(alkylamino)silane, an alkyltris(alkylamino)silane, a dialkylbis(alkylamino)silane, a trialkyl(alkylamino)silane compound.

Specific examples of the organosilane compounds represented by the general formula (4) and the general formula (5) include propyltriethoxy silane, phenyltrimethoxysilane, t-butyltrimethoxysilane, di-iso-propyldimethoxysilane, iso-propyl-iso-butyldimethoxysilane, di-iso-pentyldimethoxysilane, bis(2-ethylhexyl)dimethoxysilane, t-butylmethyldimethoxysilane, t-butylethyldimethoxysilane, dicyclopentyldimethoxysilane, dicyclohexyldimetoxysilane, cyclohexylcyclopentyldimethoxysilane, cyclohexylmethyldimethoxysilane, tetraethoxysilane, tetrabutoxysilane, bis(ethylamino)methylethylsilane, t-butylmethylbis(ethylamino)silane, dicyclohexylbis(ethylamino)silane, dicyclopentylbis(ethylamino)silane, bis(methylaminoxmethylcyclopentylamino)methylsilane, diethylaminotriethoxysilane, bis(cyclohexylamino)dimethoxysilane, bis(perhydroisoquinolino)dimethoxysilane, bis(perhydroquinolino)dimethoxysilane and ethyl(isoquinolino)dimethoxysilane.

In particular, as the organosilane compounds represented by the general formula (4) and the general formula (5), phenyltrimethoxysilane, t-butylmethyldimethoxysilane, t-butylethyldimethoxysilane, di-iso-propyldimethoxysilane, iso-propyl-iso-butyldimethoxysilane, di-iso-pentyldimethoxysilane, diphenyldimethoxysilane, dicyclopentyldimethoxysilane, cyclohexylmethyldimethoxysilane, tetramethoxysilane, tetraethoxysilane, t-butylmethylbis (ethylamino)silane, dicyclohexylbis(ethylamino)silane, dicyclopentylbis(ethylamino)silane, bis(perhydroisoquinolino)dimethoxysilane, diethylaminotriethoxysilane and the like are preferable.

In addition to the external electron donor described above, two or more among the compounds represented by the above general formulas (1) and (2), the organosilane compounds represented by the general formula (4), and the organosilane compounds represented by the general formula (5) may be selected and used in combination. In the catalyst for polymerization of olefins the content ratio of each component is arbitrary and is not particularly limited as long as it positively effects the polymerization of olefins to polyolefins.

The catalyst for polymerization of olefins comprises preferably 1 to 2000 mol of, and more preferably 50 to 1000 mol of the organoaluminum compounds described above per mol of titanium atoms in contact product for polymerization of olefins described above.

In addition, the catalyst for polymerization of olefins comprises preferably 0.002 to 10 mol of, more preferably 0.01 to 2 mol of, and still more preferably 0.01 to 0.5 mol of the external electron donor described above per mol of the organoaluminum compounds described above.

In any embodiment, a catalyst for polymerization of olefins that has a polymerization activity equivalent to or higher than that of the case using a solid catalyst component in which a phthalic acid ester compound or diether compound is used as an internal electron-donating compound, and that can produce impact copolymer with an excellent bulk density and a low content of olefin oligomers can be provided.

In any embodiment the method for producing a catalyst for polymerization of olefins is characterized in that a contact product is obtained by bringing the followings into contact with each other: the contact product for polymerization of olefins and one or two or more organoaluminum compounds selected from the following general formula (3) as described above; and one or more of the external electron donors. In the method for producing a catalyst for polymerization of olefins it is preferable that a contact product be obtained by bringing not only the contact product for polymerization of olefins and the organoaluminum compounds represented by the general formula (3), but also an external electron donor into contact with each other. The details of the external electron donor are as mentioned above.

In the method for producing a catalyst for polymerization of olefins the catalyst may be prepared by bringing the contact product for polymerization of olefins the organoaluminum compounds represented by the general formula (3) and the external electron donor optionally used into contact in the absence of olefins, or as mentioned below, the contact product may be obtained by bringing them into contact in the presence of olefins (in the polymerization system). It is preferable that the contact product be obtained by bringing them into contact in the presence of olefins (in the polymerization system).

In any embodiment, a method for conveniently producing a catalyst for polymerization of olefins that has a polymerization activity equivalent to or higher than that of the case using a solid catalyst component in which a phthalic acid ester compound or diether compound is used as an internal electron-donating compound, and that can produce impact copolymer with an excellent bulk density and a low content of olefin oligomers can be provided.

The impact copolymer can be made by a process for polymerization of olefins that is carried out by using the catalyst for polymerization of olefins. In the method for producing a polymer of olefins an objective polymer of olefins can be produced by carrying out homopolymerization or copolymerization of olefins by using the catalyst for polymerization of olefins.

Examples of the olefins include ethylene, propylene, 1-butene, 1-pentene, 4-methyl-1-pentene and vinylcyclohexane, and one of these olefins may be used, or two or more of them may be used. As the olefin, one or two or more selected from ethylene, propylene and 1-butene are preferable, and propylene is more preferable.

When polymerization of propylene is carried out, copolymerization with another olefin may also be carried out. Examples of the olefins to be copolymerized include ethylene, 1-butene, 1-pentene, 4-methyl-1-pentene and vinylcyclohexane, and one of them or two or more of them may be used. As the olefin, one or two or more selected from ethylene and 1-butene are preferable.

The details of the catalyst for polymerization of olefins according to the present used for the method for producing a polymer of olefins are as mentioned above.

Normally, the amount of the organoaluminum compounds constituting the catalyst for polymerization of olefins described above is preferably 1 to 2000 mol, and more preferably 50 to 1000 mol per mol of titanium atoms in the contact product for polymerization of olefins. In addition, the amount of the external electron donor constituting the catalyst for polymerization of olefins described above is preferably 0.002 to 10 mol, more preferably 0.01 to 2 mol of, and still more preferably 0.01 to 0.5 mol per mol of the organoaluminum compounds.

In the method for producing a polymer of olefins it is preferable that, while the contact product for polymerization of olefins the organoaluminum compounds represented by the general formula (3) and the external electron donor optionally used are brought into contact in the presence of olefins (in the polymerization system), thereby preparing a contact product (a catalyst for polymerization of olefins), the olefins be polymerized.

In the method for producing a polymer of olefins when olefins is polymerized while preparing a catalyst for polymerization of olefins, the order of charging and contact of each component constituting the catalyst for polymerization of olefins can be arbitrarily selected.

For example, it is desirable that the organoaluminum compounds be charged into the polymerization system at first, and then, the contact product for polymerization of olefins be charged.

In addition, when a catalyst for polymerization of olefins that comprises the external electron donor is used, it is desirable that the organoaluminum compounds be charged into the polymerization system at first, the external electron donor be charged next, and then, the contact product for polymerization of olefins be charged.

The method for producing a polymer of olefins can be performed in the presence of or in the absence of an organic solvent. In addition, olefin monomers such as propylene can be used either in a gaseous state or in a liquid state.

In the method for producing a polymer of olefins the polymerization temperature is preferably 200° C. or lower, and more preferably 100° C. or lower.

In the method for producing a polymer of olefins the polymerization pressure is preferably 10 MPa or less, and more preferably 5 MPa or less.

In addition, the method for producing a polymer of olefins can be either continuous polymerization method or batch polymerization method. Furthermore, the polymerization reaction may be carried out in one stage or may be carried out in two or more stages.

In addition, in the method for producing a polymer of olefins upon polymerization of olefins using the catalyst for polymerization of olefins (also referred to as the present polymerization), in order to further improve the catalytic activity, the stereoregularity, and the particle properties of the polymer to be produced, it is preferable to carry out preliminary polymerization prior to the present polymerization, and at the time of preliminary polymerization, a monomer such as olefins that is the same as those for the present polymerization or styrene can be used.

Upon carrying out the preliminary polymerization, the order of contact of each component constituting the catalyst for polymerization of olefins described above and a monomer (olefin) is arbitrary, but preferably, it is preferable that the organoaluminum compounds be charged at first into the preliminary polymerization system that has been set to an inert gas atmosphere or olefins gas atmosphere, the contact product for polymerization of olefins be charged next and brought into contact, and then olefins such as propylene be brought into contact alone, or a mixture of olefins such as propylene and one or two or more of other olefins be brought into contact.

When the external electron donor is further charged into the preliminary polymerization system in the preliminary polymerization described above, it is preferable that the organoaluminum compounds be charged at first into the preliminary polymerization system that has been set to an inert gas atmosphere or olefins gas atmosphere, the external electron donor be charged next and brought into contact, the contact product for polymerization of olefins be further brought into contact, and then olefins such as propylene be brought into contact alone, or a mixture of olefins such as propylene and one or two or more of other olefins be brought into contact.

Note that, when the preliminary polymerization is carried out in combination with the external electron donor, a method is desirable in which the organoaluminum compounds are charged at first into the preliminary polymerization system that has been set to an inert gas atmosphere or olefins gas atmosphere, the external electron donor is brought into contact next, the contact product for polymerization of olefins is further brought into contact, and then olefins such as propylene or a mixture of propylene and one or two or more of other olefins is brought into contact.

In the case of producing the impact copolymer, the production is carried out through multistage polymerization in two or more stages, and normally, the copolymer can be obtained by polymerizing propylene using the catalyst for polymerization at the first stage and copolymerizing ethylene and propylene at the second stage. Also, an α-olefin other than propylene can be polymerized together or alone at the second stage or at the time of subsequent polymerization. Examples of the α-olefin include ethylene, 1-butene, 4-methyl-1-pentene, vinylcyclohexane, 1-hexene and 1-octene.

Specifically, at the first stage, polymerization process to make the inventive impact copolymers is carried out by adjusting the polymerization temperature and residence time such that the proportion of the polypropylene matrix phase is within a range from 5, or 10, or 20 wt % to 80, or 90, or 95 wt %, and then, at the second stage, ethylene and propylene or another α-olefin are introduced and polymerization is carried out such that the proportion of the EPR dispersed phase is within a range from 5, or 10, or 20 wt % to 80, or 90 wt %. Preferably, the impact copolymers comprise (or consist essentially of) within a range from 5 wt % to 40 wt % EPR, and within a range from 60 wt % to 95 wt % polypropylene.

Figure 2:
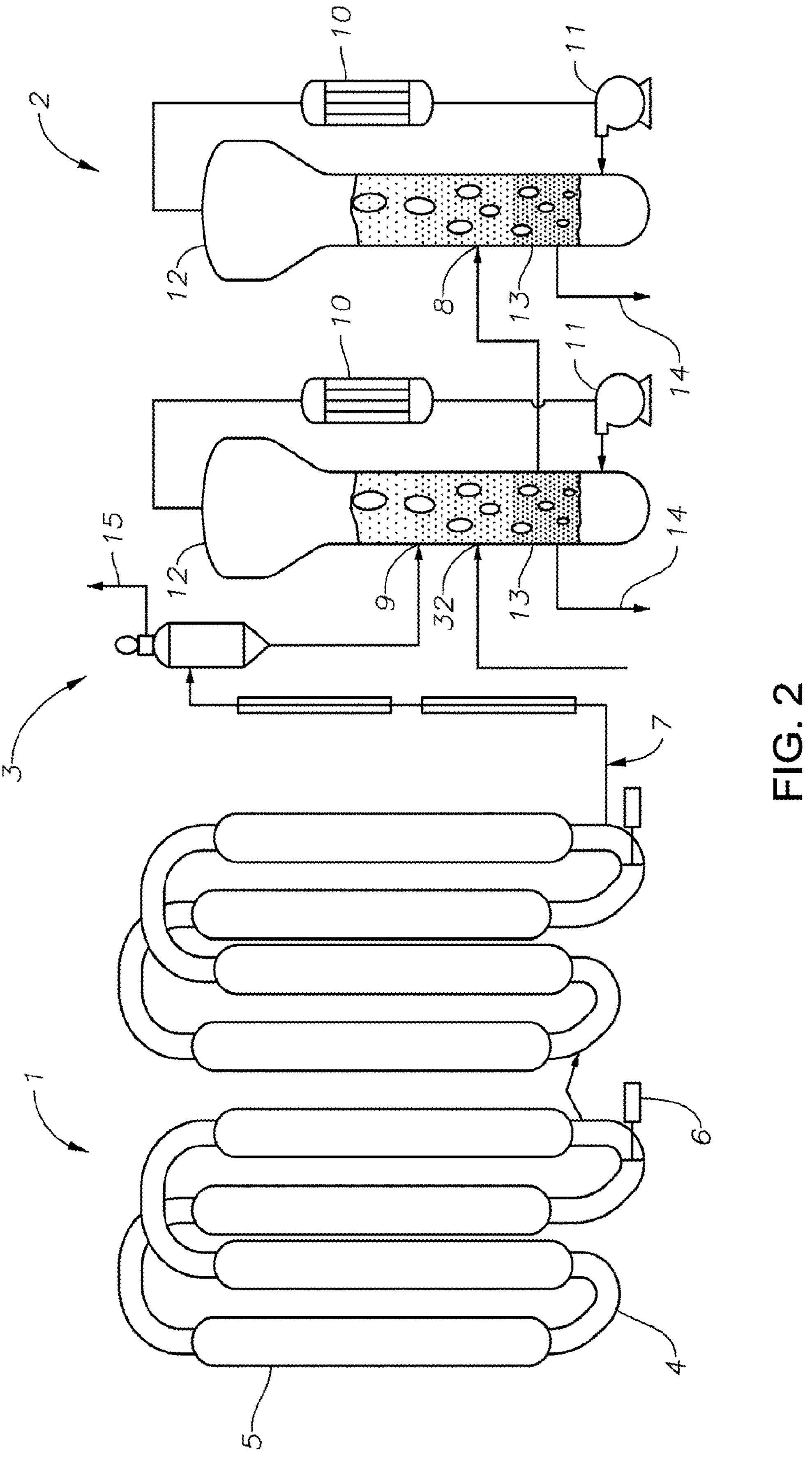
FIG. 2 is a schematic drawing of an embodiment of a polymerization apparatus suitable for making the impact copolymers described herein, comprising two loop slurry reactors in series with a gas phase reactor and an optional second gas phase reactor.

The stage to produce the polypropylene can take place in two or more series reactors, each run under identical conditions (e.g., level of hydrogen, comonomer, temperature, identity or level of external electron donor(s), etc.) to make the same type of polypropylene, or under different conditions to make a polypropylene that is bimodal in some feature such as molecular weight or comonomer content. Likewise, as shown for example in FIG. 2, there can be two or more reactors in series for the second stage and these reactors can be run under identical conditions to make the same type of EPR, or under different conditions to make a EPR that is bimodal in some feature such as molecular weight or comonomer content. Most preferably, the first stage to produce the polypropylene matrix phase takes place in a slurry polymerization process, in loop slurry reactors as shown in FIG. 2, and the second stage to produce the EPR finely dispersed within the matrix phase takes place in one or more gas phase reactors as shown in FIG. 2.

The polymerization temperatures at the first stage and the second stage are both preferably 200° C. or lower, and more preferably 100° C. or lower. The polymerization pressure is preferably 10 MPa or less, and more preferably 5 MPa or less. In addition, the polymerization time at each polymerization stage, or the residence time in the case of continuous polymerization is normally 1 minute to 5 hours.

Examples of the polymerization method include a slurry polymerization method in which a solvent of an inert hydrocarbon compound such as cyclohexane and heptane is used, a bulk polymerization method in which a solvent such as liquefied propylene is used, and a gas phase polymerization method in which a solvent is substantially not used.

Examples of the preferable polymerization method may include the bulk polymerization method and the gas phase polymerization method.

An apparatus suitable for making the inventive impact copolymers is shown with respect to FIG. 2. As shown in FIG. 2, the slurry polymerization reactor 1 is fluidly connected to the gas phase polymerization reactor 2. In any embodiment and as shown, the slurry polymerization reactor can be a slurry loop reactor. Also as shown, each loop 4 can have a heat removal jacket 5. In the slurry polymerization reactor 1, an effluent 7 comprises polyolefin (preferably polypropylene), α-olefin monomer (preferably propylene), catalyst and typically hydrogen to effect the molecular weight of the forming polyolefin. The effluent 7 can be continuously fed to the gas phase polymerization reactor 2. Further, liquid α-olefin monomer (i.e., neat propylene) or α-olefin monomer in solution (i.e., propylene with a diluent) can be recycled to the slurry polymerization reactor 1 using at least one slurry polymerization reactor pump 6, and preferably another pump on the other series of loops.

In any embodiment as shown in FIG. 2, unreacted olefin monomer can be separated from the effluent 7 through a separator 3. In any embodiment, the effluent 7 can be fluidly connected to the separator 3. In the separator 3, the effluent 7 can separate into a light component stream 15 of unreacted monomer, and a heavy component stream 9 comprising polyolefin and unreacted catalyst Liquid α-olefin monomer can be vented until the α-olefin monomer is in gaseous form. In any embodiment, α-olefin monomer can be fed to gas phase polymerization reactor 2, including unreacted α-olefin monomer recycled from the separator 3.

Following optional separation, as shown in FIG. 2, polyolefin (preferably polypropylene) is fed to the inlet 9 of the gas phase polymerization reactor 2 and hydrogen is injected into the gas phase polymerization reactor at a hydrogen injection site 32. As depicted in FIG. 2, in any embodiment, the gas phase polymerization reactor 2 can be a vertical, cylindrical fluidized bed reactor having an expansion zone 12 above a fluidized bed 13. In the gas phase polymerization reactor 2, during polymerization, a polymerization medium flows into expansion zone 12. Optionally, a recycle stream taken from the top of the gas phase polymerization reactor is fluidly connected to a cooler 10 and fed to the gas phase polymerization reactor via a compressor 11. Following polymerization, polypropylene can be discharged from the gas phase polymerization reactor outlet 14.

Alternatively, an option and as shown in FIG. 2, polyolefin can be fed to an inlet 8 of a second gas phase polymerization reactor to produce impact copolymer. FIG. 2 shows an exemplary polymerization process for producing impact copolymer. Polyolefin is fed to the inlet 8 of a second gas phase polymerization reactor 16. Polyolefin is combined with olefin monomer and comonomer (preferably propylene and ethylene) to generate the EPR and hence the impact copolymer. The inlet of the second gas phase polymerization reactor 8 is not limited to the variation shown in FIG. 2 and may be placed in any suitable location. Following polymerization, the impact copolymer is discharged from the outlet 14 from the second gas phase polymerization reactor 16.

As described, hydrogen can be added to either the slurry loop reactors that produce the polypropylene portion of the impact copolymer, added to the gas phase reactor that produce the EPR portion of the impact copolymer, or both. In any embodiment hydrogen added to the slurry loop reactors can be carried over to the gas phase reactors in whole or in part, and can be regulated by removing excess hydrogen within or prior to entering the gas phase reactor using a mechanical separator such as by a cycling transfer system or using a chemical agent such as titanocene catalyst (see e.g., U.S. Pat. No. 10,544,237). Alternatively, if there is little or no hydrogen in the slurry loop reactors that are producing the polypropylene, hydrogen can be added to the gas phase reactors to control the molecular weight of the EPR. In this manner, the molecular weight (e.g., as evidenced by the melt flow rate or intrinsic viscosity) of the polypropylene and EPR components of the impact copolymer can be varied. As described for example in U.S. Pat. No. 6,005,034, in any embodiment, regardless of the type of catalyst used, the melt flow rate of the polypropylene portion of the impact copolymer can vary from 5, or 10, or 20, or 50, or 100 g/10 min or more, preferably within a range from 5, or 10, or 20, or 50, or 100 g/10 min to 200, or 250, or 300, or 350, or 400, or 450, or 500, or 800, or 1000 g/10 min or more. Likewise, the EPR portion of the impact copolymer can have an intrinsic viscosity within a range from 2, or 2.5, or 3 dL/g to 6, or 7, or 8, or 9, or 10, or 12 dL/g or more. Any molecular weight combination of polypropylene and EPR can be combined to make an impact copolymer.

It is also desirable to treat the reactor granules of polymer to remove solvents, monomers and other volatile organic compounds such as oligomers. In any embodiment, unfinished polypropylene granules, which could include homopolymer, random copolymer, and/or impact copolymers, leaves the final stage of reaction in a granular form still containing light hydrocarbons, primarily the propylene and sometimes ethylene or other co- or ter-monomers used to produce the polymer, either trapped within the granules or in the gas phase surrounding the granules. The granules are routed through one or more low-pressure (generally 2 barg or less) separation vessels to remove as much of this hydrocarbon as possible. However, small amount of light hydrocarbons such as monomers, as well as smaller quantities of heavier oligomers remain trapped in the polymer and surrounding vapor space.

Figure 3:
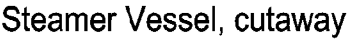
FIG. 3 is a schematic drawing of the steamer and dryer apparatus that can be used in the process of producing the inventive impact copolymer.
Figure 3:
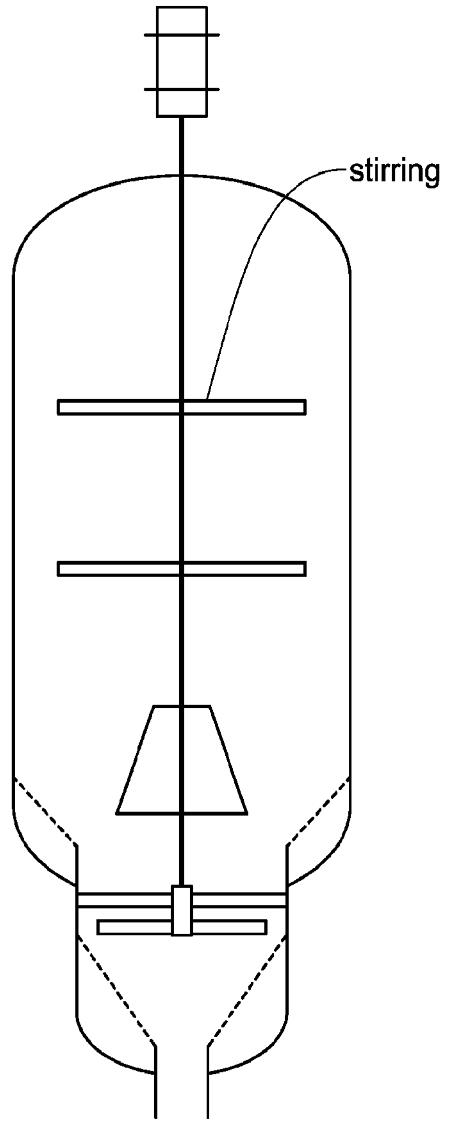
Figure 3:
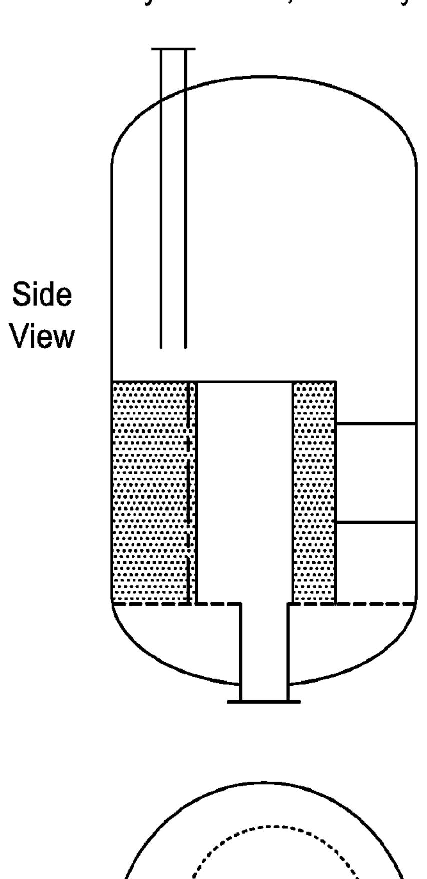
Figure 3:
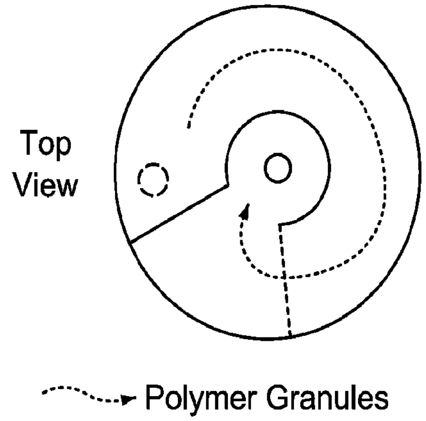

To remove the smaller quantities of light hydrocarbons and oligomers, in any embodiment the ICP granules from the reactor are contacted with large quantities of vaporized water or "steam" (60 to 100 kg steam/1000 kg polymer). This is done in a steaming vessel or "steamer", as shown in FIG. 3, allowing direct contact between steam injected at one or more locations throughout the vessel with the polymer which is gravity-fed from top to bottom through the vessel. The internals of the drum are designed in various ways, but typically with slotted or perforated plates allowing steam to pass through into the polymer stream at a high enough velocity to prevent polymer from entering the steam-side of the injection points. The steam mass flow rate is high enough to heat the polymer to 100 to 110° C. to encourage hydrocarbon removal, including heavier oligomers, in a vessel with the diameter sized to prevent fluidization of the bed of granules. Steam velocity is typically maintained low enough to provide a bed condition that is just below the fluidization point. This ensures the polymer moves through the vessel in a plug-flow manner, as opposed to entering a fluidized-mixing regime. The fluidized bed would preferably allow a fraction of the total polymer in the vessel to "bypass" the vessel since some amount would then flow straight to the bottom of the vessel and out prior to achieving the residence time required to heat and devolatilize the polymer to the degree required.

In any embodiment, polymer from the bottom of the steaming vessel is then transferred into a dryer vessel as shown in FIG. 3 to remove the contained moisture from the steaming drum. Nitrogen is introduced at the bottom of the dryer at a velocity, in this case, sufficient to fluidize the granules and a mass flow sufficient to contain all of the water that flows into the vessel. Nitrogen mass flow is typically between 100 kg/T of polymer to 500 kg/T of polymer. Fluidization in this vessel is important to fully remove the moisture and any trace amounts of oligomers and other volatile organic compounds left in the polymer prior to being transferred downstream to polymer finishing facilities. The superficial velocity (velocity as calculated in an empty vessel without granules) of the nitrogen stream is around 0.5 meters/second or higher to achieve fluidization; this is achieved via proper sizing of the diameter of the vessel, while fluidization and residence time is maintained with proper sizing of the internals to control the height of the polymer bed relative to the vessel diameter. Operation in this mode would allow granules bypass straight to the outlet as described above however. Thus, the internals of the drum are fitted with a device that forces the granules to reach a minimum residence time in the vessel by directing them in a circular flow path through the vessel. A metal barrier is used for this purpose as shown in FIG. 3. Granules flow in on one side of the barrier, then must flow around the outside of the semi-circular barrier to reach the outlet pipe at the bottom of the vessel. Perforated plates at the bottom of the vessel allow the nitrogen to flow into the vessel such that the hole is partially covered at the top. This prevents polymer from falling into the holes and increasing plugging in the plate, and also allows some ability to force the nitrogen flow at the surface of the plate in the direction of granules flow to help "sweep" the plate toward the outlet of the vessel. Near the outlet, these holes are aligned to orient flow as straight toward the outlet pipe as possible, while in the rest of the vessel they are oriented to keep nitrogen flowing in the circular direction of granules flow caused by the barrier and vessel walls.

In any embodiment the overhead gas from the steamer vessel is fed to a scrubbing tower, via a cyclone. The cyclone removes polymer fines from the wet gas stream and feeds them back to the steamer vessel. The gas continues to the scrubber tower, which condenses the water from the stream of hydrocarbon gas stripped from the polymer granules. The water is cooled and partially recirculated through the tower as reflux to assist condensation from the incoming gas, while also cooling the hydrocarbon gas somewhat. A built-in cooling exchanger at the top of the tower also provides cooling to the overhead hydrocarbon stream. Excess water is drained to a separation vessel or treatment facility as needed. The internals in the bottom of this tower are designed to minimize turbulence in the liquid water level maintained at the bottom. This allows "scrubbed" polymer fines to be removed from the water and out to a recovery vessel off of the surface of the water. These internals allow polymer to be separated under a plate that forces water with polymer fines up and out from under this plate, while providing "clean" water above the plate, such that water level can be reliably measured and maintained, via a dip tube extending through the plate to near the bottom of the tower.

The hydrocarbon stream recovered in the overhead of the tower is then compressed and cooled again to further remove water from the stream. It is then routed to a series of vessels to separate heavier oligomers and/or oily materials that are also stripped from the polymer in the steamer vessel. The hydrocarbon stream may then be treated further with desiccant dryers to remove virtually all moisture for recycle directly back to the feed system for the polypropylene plant, or back to another recovery source to purify the monomers and other hydrocarbons in this stream.

In any embodiment the gas from the dryer overhead is routed to a separate scrubbing tower, again via a cyclone to separate fines to the outlet of the dryer vessel. The scrubber tower in this case condenses water from the nitrogen such that the nitrogen leaving the tower at the overhead is recirculated to the dryer via a high-volume compressor, typically also including a heating step to heat the nitrogen to between 90 and 130° C. In some cases where cooler granules are desired however, this nitrogen may only be heated to 45 to 90° C. Water condensed in the tower is again recirculated for reflux flow, while the excess is drained from the bottom to the same separator or treatment facility as that from the steamer scrubber tower. A standpipe at the bottom (typically a different design layout than with the steamer scrubber) allows polymer to be separated from the liquid water level maintained at the bottom to a recover vessel or tank. A weir is used at the bottom outlet of the tower to the water reflux pump to ensure only clean water from the bottom of this level is recirculated through the tower.

These catalyst and process features can be used in any embodiment to make a polypropylene or impact copolymer having lower VOC's and oligomers.

In any embodiment, a polypropylene homopolymer or random copolymer comprising within a range from 0.1 to 2, or 3 wt % olefin comonomer such as ethylene can be produced having improved stiffness, impact strength, and low oligomers as described herein. Exemplary embodiments described below are directed to the in situ blend of a polypropylene homopolymer with an EPR to form an impact copolymer.

In any embodiment, a method for producing impact copolymer with an excellent bulk density and a low content of olefin oligomers under a polymerization activity equivalent to or higher than that of the case using a solid catalyst component in which a phthalic acid ester compound or diether compound is used as an internal electron-donating compound can be provided.

In any embodiment, the impact copolymer described herein comprises a polypropylene, preferably a homopolymer of polypropylene, and within a range from 5, or 8 wt % to 30, or 40 wt % of an EPR, by weight of the impact copolymer; wherein the polypropylene has a melt flow rate within a range from 100 g/10 min to 300, or 350, or 400 g/10 min, and the impact copolymer has a melt flow rate within a range from 15 g/10 min to 120, or 150 g/10 min; and wherein there are less than 1000, or 800, or 700 μg of oligomer per gram of impact copolymer. These values can be determined as described below. Preferably, the impact copolymer comprises within a range from 60, or 70 wt % to 92, or 95 w %, by weight of the impact copolymer, of the polypropylene.

In any embodiment, the overall amount of comonomer in the impact copolymer is within a range from 2, or 5 wt % to 15, or 20, or 25, or 30 wt %, by weight of the impact copolymer. This can be determined as described below.

In any embodiment, the EPR has an intrinsic viscosity within a range from 3, or 3.5 dL/g to 6, or 7, or 8 dL/g. This can be determined as described below.

The impact copolymers herein not only have a low amount of oligomers, representative of VOC's, but other features. In any embodiment the impact copolymer has a Flexural Modulus of at least 1000, or 1200, or 1400 MPa, or within a range from 1000, or 1200 MPa, to 2000, or 2200 MPa. Also in any embodiment the impact copolymer has a RTNI value of at least 2, or 2.2 $kJ/m^2$, or within a range from 2 $kJ/m^2$ to 15 $kJ/m^2$.

In any embodiment the inventive impact copolymers are made by combining olefins with the contact product of a solid magnesium compound and a halogen-containing titanium compound described herein with at least one phthalic acid ester compound and at least one diether compound as internal electron donors as described herein.

In any embodiment, the inventive impact copolymers are made by combining propylene and the contact product (the solid magnesium and halogen-containing titanium compound and internal donors) with one or more external electron donors and organoaluminum compound to form a polypropylene reaction product, and wherein the polypropylene is them combined with ethylene and propylene to form EPR domains interspersed within the polypropylene matrix. In any embodiment, the polypropylene reaction product is formed in a slurry polymerization process, and the EPR is formed in a gas phase reactor process. The slurry and gas phase processes are preferably in series, so the polypropylene product from the slurry reaction goes directly, along with the still active catalyst, into the gas phase process.

Described another way, in any embodiment is an impact copolymer obtained by combining a solid magnesium and halogen-containing titanium compound with propylene and hydrogen in a slurry reactor to produce a polypropylene reaction product, followed by combining ethylene and propylene with the polypropylene reaction product and hydrogen in a gas phase reactor to obtain the impact copolymer comprising a polypropylene and within a range from 5 wt % to 40 wt % of an EPR, by weight of the impact copolymer; wherein the polypropylene has a melt flow rate within a range from 100 g/10 min to 300, or 350, or 400 g/10 min, and the impact copolymer has a melt flow rate within a range from 15 g/10 min to 150 g/10 min; and wherein there are less than 1000 μg of oligomer per gram of impact copolymer. In any embodiment, as the level of hydrogen in the slurry reactor is decreased, the level of oligomers decreases. Also, in any embodiment the solid magnesium and halogen-containing titanium compound comprises at least one phthalic acid ester compound and at least one diether compound as internal electron donors. Also in any embodiment, at least one external electron donor and organoaluminum are also combined in the slurry and gas phase reactors. The impact copolymer thus produced may be described by any of the features for the inventive impact copolymer described herein.

Also in any embodiment is a method to make an impact copolymer comprising combining a solid magnesium and halogen-containing titanium compound with propylene and hydrogen in a slurry reactor to produce a polypropylene reaction product, followed by combining ethylene and propylene with the polypropylene reaction product and hydrogen in a gas phase reactor to obtain the impact copolymer comprising a polypropylene and within a range from 5 wt % to 40 wt % of an EPR, by weight of the impact copolymer; wherein the polypropylene has a melt flow rate within a range from 100 g/10 min to 400 g/10 min, and the impact copolymer has a melt flow rate within a range from 15 g/10 min to 150 g/10 min; and wherein there are less than 1000 μg of oligomer per gram of impact copolymer. The impact copolymer thus produced and the catalyst used to make it may be described by any of the features for the inventive impact copolymer described herein.

The impact copolymers disclosed herein may be used in any number of articles such as in appliance components and automotive components. Such components may be made by any means such as thermoformed, blow molded, or injection molded. The impact copolymer may be part of a composition, which is in turn part of the appliance or automotive component. Preferably the inventive impact copolymers are useful in (injection) molded automotive components, that is, of interior or exterior automotive component. The term "automotive component" used in the instant invention indicates that it is a formed three-dimensional article for the interior or exterior of automotives. Typical automotive components are bumpers, body panels, rocker panels, side trim panels, interior trims, step assists, spoilers, fenders, dash boards and the like. The term "exterior" indicates that the article is not part of the car interior but part of the car's exterior. Accordingly, preferred exterior automotive components are selected from the group consisting of bumpers, side trim panels, step assists, body panels, fenders and spoilers. In contrast thereto, the term "interior" indicates that the article is part of the car interior but not part of the car's exterior. Accordingly, preferred interior automotive components are selected from the group consisting of rocker panels, dash boards and interior trims.

Preferably the automotive component comprises at least 50 wt %, more preferably at least 55 wt %, yet more preferably at least 70 wt %, still more preferably at least 80 wt %, still yet more preferably consists of the impact copolymer. The remainder may be another impact copolymer, elastomer, or polypropylene, polyethylene, or combinations thereof.

In any embodiment, the automotive component, that is, the exterior or interior automotive component, comprises at least 80 wt %, more preferably at least 90 wt %, yet more preferably at least 95 wt %, still more preferably at least 99 wt %, still yet more preferably consists of the impact copolymer. The remainder may be another impact copolymer, elastomer, or polypropylene, polyethylene, or combinations thereof.

For mixing the individual components of the impact copolymer, a conventional compounding or blending apparatus, for example, an internal mixer, a 2-roll rubber mill, co-kneader or a twin screw extruder may be used. The polymer materials recovered from the extruder are usually in the form of pellets. These pellets are then preferably further processed, for example, by injection molding to generate the articles, such as the interior or exterior automotive components.

The various descriptive elements and numerical ranges describing the impact copolymers and the catalyst and process used to make the impact copolymer can be combined with other descriptive elements and numerical ranges to describe the invention; further, for a given element, any upper numerical limit can be combined with any lower numerical limit described herein.

Test Methods

Room Temperature Notched Izod (RTNI)

As used herein, all references to Notched Izod or RTNI (without reference to temperature) is a reference to impact resistance measured in accordance with ISO180 at 23° C. (±0.2 kJ/$m^2$).

Xylene-Soluble Percent (XS)

The xylene soluble fraction (wt %) is obtained by the following method. A flask equipped with a stirrer was charged with 4.0 g of the polymer (polypropylene) and 200 ml of p-xylene. The external temperature was increased to be equal to or higher than the boiling point (about 150° C.) of xylene, and the polymer was dissolved over 2 hours while maintaining p-xylene contained in the flask at a temperature (137 to 138° C.) lower than the boiling point. The solution was cooled to 23° C. over 1 hour, and an insoluble component and a soluble component were separated by filtration. A solution including the soluble component was collected, and p-xylene was evaporated by heating (drying) under reduced pressure. The weight of the residue was calculated, and the relative ratio (mass %) with respect to the polymer (propylene) was calculated to determine the xylene-soluble content (XS).

Flexural Modulus (FM)

The flexural modulus values were obtained according to ISO178 (10 MPa).

Melt Flow Rate (MFR)

The melt flow rate of the polypropylene component and the overall impact copolymer is determined by ASTM D1238, 2.16 kg, 230° C. (±0.2 g/10 min).

Method for Measuring the Amount of "Oligomers"

A soxhlet extractor was charged with 5 g of an undried polymer (polypropylene) and 100 mL of chloroform. By setting the external temperature at the boiling point of chloroform (about 80° C.) or higher, while maintaining the temperature of chloroform at the extraction part below the boiling point (60° C.), the polymer was extracted over 4 hours. Thereafter, the liquid temperature of the extraction liquid was cooled to 23° C., and the amounts of oligomeric components (C6 to C21) contained in the extraction liquid were determined using gas chromatography (GC-2014, manufactured by Shimadzu Corporation) with 2,4-dimethylheptane as the reference substance. Reported as μg oligomer per gram polymer (±10 μg/g).

Method for Determining "VOC's"

This is a standardized test procedure for hydrocarbons and was used to test emissions or high, medium, and low volatility compounds. Based on *Verband der Automobilindustrie e.V.* VDA277 (1995). Reactor granules of the impact copolymer were placed in an airtight septum sealed chromatographic vial and then heated to 120° C. for 5 hours. The gas resulting from such treatment in the headspace of the vials was withdrawn and tested by gas chromatography. A gas chromatographic system using Restik RTx™ wax column (polyethylene glycol) with an internal diameter of 0.25 mm and coating thickness of 0.25 μm and length of 30 m was used. A flame ionization detector was used to detect the hydrocarbons ("C") at 250° C. The oven program started at 50° C. for 3 minutes, then proceeded to 200° C. at 12 K/min and concluded at 200° C. for 4 min. Reported as μg hydrocarbon volatile per gram polymer (±5 μg/g).

Ethylene Content and Intrinsic Viscosity (IV) of ICP

The insoluble crystalline (polypropylene) and soluble amorphous fractions (ethylene-propylene copolymer or rubber) of the impact copolymers as well as the comonomer content and intrinsic viscosities of the respective fractions were determined by the use of a soluble fractional analysis instrument ("SFRA"), using a Crystex™ QC, Polymer Char (Valencia, Spain) instrument. The crystalline and amorphous fractions were separated through temperature cycles of dissolution at 160° C., crystallization at 40° C. and re-dissolution in 1,2,4-trichlorobenzene (TCB) at 160° C. Quantification of the fractions and determination of ethylene content (C2) were achieved by means of an infrared detector ("IR4") and an online 2-capillary viscometer was used for determination of the intrinsic viscosity ("IV").

The IR4 detector was a multiple wavelength detector detecting IR absorbance at two different bands (CH3 and CH2) for the determination of the concentration and the ethylene content in EPR. The IR4 detector was calibrated with series of EP copolymers with known ethylene content in the range of 2 wt % to 69 wt % (determined by $^{11}$C-NMR) by weight of the polymers.

The intrinsic viscosity of the EPR was determined with a use of an online 2-capillary viscometer correlated to corresponding IV's determined by a standard method in decalin according to ISO 1628. Calibration was achieved with various EP copolymers having a known IV within a range from 2 to 4 dL/g. Reported IV values have a standard deviation of 0.02 to 0.1.

Measurements were carried on 10 mg/ml to 20 mg/ml samples. After automated filling of the vial with TCB containing 250 mg of 2,6-di-tert-butyl-4-methylphenol (BHT) as antioxidant, the sample was dissolved at 160° C. until complete dissolution is achieved, usually for 60 min, with constant stirring of 800 rpm. A defined volume of the sample solution was injected into the column filled with inert support where the crystallization of the sample and separation of the soluble fraction from the crystalline part is taking place. This process was repeated two times. During the first injection, the whole sample was analyzed at high temperature, determining the weight percent of C2 of the impact copolymer. During the second injection, the soluble EPR fraction (at low temperature) and the crystalline PP fraction (at high temperature) with the crystallization cycle were measured (wt % of the soluble EPR, its wt % C2, and its IV). Reported EPR and C2 weight percentages have a standard deviation of 1 to 2.

EXAMPLES

The present invention will be specifically described by contrasting Inventive Examples with Comparative Examples, but the invention is not limited to the following examples. In the tables below, catalyst A is a commercial Ziegler-Natta type catalyst THC-133 (Toho Titanium) used to make comparative impact copolymers, and the catalyst B is the inventive catalyst made and composed as described herein and used to make the inventive impact copolymers.

Preparation of the Inventive Solid Catalyst (B) for Polymerization Examples

Into a flask with an internal volume of 500 mL that was equipped with a stirring device and replaced with nitrogen gas, 20 g (175 mmol) of diethoxymagnesium, 140 mL of toluene, 40 mL of titanium tetrachloride and 17.3 mmol (4.3 g) of dipropyl phthalate were added, thereby obtaining a first contact product.

The temperature of the first contact product described above was elevated, and in the middle of the temperature elevation at 90° C., 16.8 mmol (3.6 g) of 2-isopropyl-2-isopentyl-1,3-dimethoxypropane was added. The temperature was further elevated to 113° C. and the reaction was allowed for 180 minutes at a state of retaining the same temperature. After the reaction was completed, a second contact product, which was the reaction product, was washed four times with 187 mL of toluene at 100° C.

Next, to the washed second contact product described above, 200 mL of a new toluene solution containing 15 vol % of titanium tetrachloride was added, and the temperature was elevated to 100° C. The resultant mixture was stirred and allowed to react for 120 min, and an obtained contact product was washed once with toluene at 108° C. Next, to the washed contact product described above, 200 mL of a new toluene solution containing 10 vol % of titanium tetrachloride and 2 mmol (0.5 g) of dipropyl phthalate was added, and the temperature was elevated to 108° C. The resultant mixture was stirred and allowed to react for 60 min, and after the reaction, an obtained third contact product was washed twice with toluene at 100° C. Thereafter, the third contact product was washed seven times with 151 mL of n-heptane at 60° C., and through the solid-liquid separation, a solid catalyst component for polymerization of an olefin was obtained.

The results of component analysis and physical property evaluation of the obtained solid catalyst component for polymerization of an olefin are shown in Table 1 and Table 2, respectively.

Note that dipropyl phthalate was used as a phthalate and 2-isopropyl-2-isopentyl-1,3-dimethoxypropane was used as a diether among internal electron-donating compounds.

Description of the Process to Make the Impact Copolymers

Into a reactor as described below, nitrogen gas, triethylaluminum, the solid catalyst component described above, and the external electron donors described below were charged, thereby forming a catalyst for polymerization of an olefin. Thereafter, polymerizations were carried out as described below to obtain the impact copolymers.

The polypropylene resins were produced in a bulk continuous pilot scale reactor. The catalyst solid was used with an external donor described in U.S. Pat. No. 6,087,495. The donor system was a blend of dicyclopentyl dimethoxy silane (DCPMS) and propyltriethoxy silane (PTES). Catalyst preparation was carried out continuously in situ by contacting the catalyst solids, triethylaluminum, and the donor system under conditions known in the art to yield active, stereospecific catalyst for polymerization of propylene. The activated catalyst was continuously fed to a prepolymerization reactor where it was continuously polymerized in propylene to a productivity of approximately 100 to 400 g-polymer/g-cat. The prepolymerized catalyst was then continuously fed to a bulk slurry reactor, and polymerization continued at 70° C. to 80° C., for a residence time of about 110 minutes. Hydrogen was used in the reactor to control the melt flow rate of the polypropylene homopolymer resin and the amounts used are listed in Table 1.

The reaction slurry (homopolymer granules in bulk propylene) was removed from the reactor and the homopolymer granules were continuously separated from the liquid propylene. The homopolymer granules were separated from the unreacted monomer and fed into a gas phase reactor. The granules from the bulk reactor, after removing the monomer, are fed to a gas phase reactor (GPR) where polymerization continued under conditions known in the art to produce EPR within the interstitial pores of the homopolymer granules. The catalyst activity in the gas phase reactor was controlled by both an anti-static agent and a catalyst surface poisoning agents to control the composition of the EPR. The final product, the impact copolymer, was continuously withdrawn from the gas phase reactor and separated from unreacted monomer to produce a granular product for compounding and mechanical property testing. The molecular weight of the EPR or more appropriately, Intrinsic Viscosity (IV) of the EPR (dispersed) phase was controlled by the concentration of hydrogen in the gas phase reactor.

The copolymer granules thus obtained are stabilized with 0.15 wt % Irganox™ 1010, 0.05 wt % Ultranox™ 626A, and 0.10 wt % sodium benzoate (fine form), then pelletized on a 30 mm Werner & Pfleiderer twin screw extruder. The pellets were injection molded into ASTM test specimens using a 120 ton Van Dom injection molding machine and ISO test specimens using a 110 ton Van Dom injection molding machine. The physical properties were tested, respectively, as per ASTM and ISO guidelines. The IV (Intrinsic Viscosity) of the EPR, % EPR, and % C2 (amount of ethylene-derived units in the ICP) were determined by SFRA as described above. Table 1 is a summary of the process conditions for each experiment, where three experiments were carried out using solid catalyst components (including internal donors) catalyst A and three experiments using catalyst B, all using the same external electron donor combination. The values for hydrogen (ppm) are the head-space concentration, not a measurement of the level of hydrogen actually in the slurry.

TABLE 1

Process Conditions and SFRA measured values of ICP's

| | A-1 | A-2 | A-3 | B-1 | B-2 | B-3 |
|---|---|---|---|---|---|---|
| Propylene Slurry $H_2$ (ppm) | 77,644 | 68,294 | 54,180 | 65,192 | 54,148 | 47,898 |
| GPR $H_2$ (ppm) | 1766 | 7899 | 19,000 | 5491 | 7968 | 16,226 |
| wt % C2 | 3.2 | 8.9 | 13.2 | 2.3 | 9.3 | 12.9 |
| IV (EPR) (dL/g) | 6.1 | 4.6 | 3.7 | 4.3 | 4.8 | 3.7 |
| wt % EPR | 8.5 | 16.8 | 23.6 | 7.0 | 17.5 | 24.7 |
| Catalyst Activity (kg/g) | 49 | 58 | 58 | 63 | 65 | 85 |

The results of polymerization evaluation and evaluation of the amount of oligomers of the obtained propylene homopolymer are shown in Table 2.

TABLE 2

Physical properties of the comparative and inventive impact copolymers

| Catalyst | hPP MFR (g/10 min) | ICP MFR (g/10 min) | Flex Modulus (MPa) | RTNI ($kJ/m^2$) | Oligomer (μg/g) | VOC (μg C/g) |
|---|---|---|---|---|---|---|
| A-1 | 259 | 111 | 1790 | 2.5 | 1296 | 432 |
| A-2 | 208 | 51 | 1390 | 6.4 | 1104 | 320 |
| A-3 | 138 | 28 | 1200 | 12.2 | 648 | 276 |
| B-1 | 298 | 143 | 1930 | 2.3 | 744 | 380 |
| B-2 | 239 | 52 | 1490 | 5.8 | 624 | 221 |
| B-3 | 173 | 29 | 1220 | 13.6 | 432 | 226 |

The inventive impact copolymers have a lower level of oligomers and VOC's as evidenced in the data of Table 2, comparing the impact copolymers made using the catalyst A and catalyst B. Further, the inventive impact copolymers have a higher stiffness at the same or improved impact resistance as highlighted in FIG. 1. There is a trend for the oligomers and VOC's to decrease with decreasing MFR of the impact copolymer. It is noted that the level of hydrogen in the slurry reactor producing the polypropylene went down from example 1 to 3, while the level of hydrogen in the gas phase reactor went up from example 1 to 3, while the overall oligomers and VOC's went down.

Homopolymerization

Homopolymerization was performed in autoclave with an internal volume of 2.0 liters that was equipped with a stirrer. 3.0 liters of hydrogen gas and 1.4 liters of liquefied propylene were charged in the autoclave with the catalyst. After carrying out preliminary polymerization at 20° C. for 5 minutes, the temperature was elevated, and a polymerization reaction was carried out at 70° C. for 1 hour, thereby obtaining a propylene homopolymer.

Characteristics of the homopolymer produced with catalyst B compared to catalyst A is provided in the following Table 3.

| Catalyst | Catalyst Ti (wt %) | Catalyst Activity (g/g/h) | MFR (g/10 min) | XS (wt %) | VOC (μg C/g) | Flex Modulus (MPa) |
|---|---|---|---|---|---|---|
| hPP Catalyst A (Comparative) | 2.9 | 49,600 | 51 | 1.6 | 1200 | 1690 |
| hPP Catalyst B | 1.6 | 66,300 | 35 | 0.6 | 560 | 1730 |

As shown in Table 3, the homopolymer produced with catalyst B has higher stiffness and significantly lower VOCs than the comparative example.

As used herein, the phrase "consisting essentially of" for a composition of matter means that there may be up to 1, or 2, or 3, or 4 wt %, by weight of the impact copolymer, of additives such as antioxidants, cross-linking agents, peroxide agents, alkyl radical scavengers, acid neutralizers, nucleating agents, fillers, colorants, polymeric compatibilizers (elastomers, plastomers, LDPE, etc.), hydrocarbon resins, and/or other such additives as are known in the art. Likewise, as it relates to a process claim, "consisting essentially of" does not exclude minor procedures such as crystallization, solvent addition or removal, heating/cooling, and exchanging or addition of gases, fluids and/or solids that are not essential and are otherwise non-reactive with the claimed components.

All publications, patents and patent applications mentioned herein are herein incorporated by reference to the same extent as if each individual publication patent, or patent application was specifically and individually indicated to be incorporated by reference.

The impact copolymer thus described, it will be apparent that its descriptive elements and ranges may be varied in many ways and that such variations are not to be regarded as a departure from the scope of the invention; and that all such modifications apparent to one skilled in the art in light of this Specification are intended to be included within the scope of the following claims.

The invention claimed is:

1. An impact copolymer comprising a polypropylene and within a range from 5 wt % to 40 wt % of an ethylene-propylene copolymer or rubber (EPR), by weight of the impact copolymer; wherein the polypropylene has a melt flow rate within a range from 160 g/10 min to 310 g/10 min, as determined by ASTM D1238, 2.16 kg, 230° C., and the impact copolymer has a melt flow rate within a range from 15 g/10 min to 150 g/10 min, as determined by ASTM D1238, 2.16 kg, 230° C.; and wherein there are less than 1000 μg of oligomer per gram of impact copolymer as determined by chloroform extraction at 60° C. to form a chloroform extract followed by gas chromatography to determine an amount of oligomer and the oligomers are C6 to C21 hydrocarbon compounds; and wherein the impact copolymer has a Flexural Modulus within a range from 1210 MPa to 1940 MPa, as determined by ISO 178.

2. The impact copolymer of claim 1, wherein the impact copolymer has a Room Temperature Notched Izod value of at least 2 $kJ/m^2$, or within a range from 2 $kJ/m^2$ to 15 $kJ/m^2$, as determined according to ISO 180 at 23° C.

3. The impact copolymer of claim 1, wherein the EPR has an intrinsic viscosity within a range from 3 dL/g to 8 dL/g, as determined according to ISO 1628.

4. The impact copolymer of claim 1, made by combining olefins with the contact product of a solid magnesium compound and a halogen-containing titanium compound with at least one phthalic acid ester compound and at least one diether compound as internal electron donors.

5. The impact copolymer of claim 4, wherein the at least one phthalic acid ester compound is selected from compounds represented by (1):

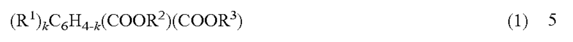

$$(R^1)_kC_6H_{4-k}(COOR^2)(COOR^3) \quad (1)$$

wherein $R^1$ represents an alkyl group having 1 to 8 carbon atoms or a halogen atom; $R^2$ and $R^3$ each represent an alkyl group having 1 to 12 carbon atoms and may be the same as or different from each other; and the number of the substituent $R^1$, k, is 0, 1, or 2, and when k is 2, a plurality of $R^1$ may be the same as or different from each other.

6. The impact copolymer of claim 4, wherein the one or more diether compounds is selected from compounds represented by (2):

(2)

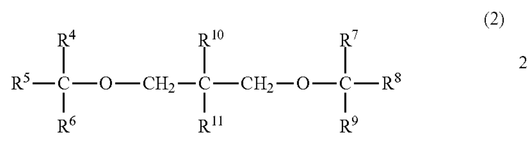

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring.

7. The impact copolymer of claim 4, wherein the contact product is made by the method comprising the following steps sequentially performed:

(i) a first step of bringing one or two or more compounds selected from phthalic acid ester compounds (1), a magnesium compound and a halogen-containing titanium compound into contact with each other, thereby obtaining a first contact product;

(ii) a second step of further bringing the first contact product obtained in the step (i) and one or two or more compounds selected from diether compounds (2) into contact with each other, thereby obtaining a second contact product, and then washing the obtained second contact product; and (iii) a third step of bringing the washed second contact product and a halogen-containing titanium compound into contact with each other to obtain a contact product, then washing the obtained contact product, and further bringing the washed contact product, one or two or more compounds selected from phthalic acid ester compounds (1) and a halogen-containing titanium compound into contact with each other, thereby obtaining a third contact product.

8. The impact copolymer of claim 4, wherein propylene and the contact product are combined with one or more external electron donors and organoaluminum to form a polypropylene reaction product, and wherein the polypropylene is then combined with ethylene and propylene to form EPR domains within the polypropylene matrix.

9. The impact copolymer of claim 8, wherein the polypropylene reaction product is formed in a slurry polymerization process, and the EPR is formed in a gas phase process.

10. The impact copolymer of claim 9, wherein as the level of hydrogen in the slurry polymerization process is decreased, the level of oligomers decreases.

11. An automotive component comprising the impact copolymer claim 1.

12. An impact copolymer obtained by combining a solid magnesium and halogen-containing titanium compound with propylene and hydrogen in a slurry reactor to produce a polypropylene reaction product, followed by combining ethylene and propylene with the polypropylene reaction product and hydrogen in a gas phase reactor to obtain the impact copolymer comprising a polypropylene and within a range from 5 wt % to 40 wt % of an EPR, by weight of the impact copolymer; wherein the polypropylene has a melt flow rate within a range from 160 g/10 min to 310 g/10 min, as determined by ASTM D1238, 2.16 kg, 230° C., and the impact copolymer has a melt flow rate within a range from 15 g/10 min to 150 g/10 min, as determined by ASTM D1238, 2.16 kg, 230° C.; and wherein there are less than 1000 μg of oligomer per gram of impact copolymer as determined by chloroform extraction at 60° C. to form a chloroform extract followed by gas chromatography to determine an amount of oligomer and the oligomers are C6 to C21 hydrocarbon compounds; and wherein the impact copolymer has a Flexural Modulus within a range from 1210 MPa to 1940 MPa, as determined by ISO 178.

13. The impact copolymer of claim 12, wherein as the level of hydrogen in the slurry reactor is decreased, the level of oligomers decreases.

14. The impact copolymer of claim 12, wherein the solid magnesium and halogen-containing titanium compound comprises at least one phthalic acid ester compound and at least one diether compound as internal electron donors.

15. The impact copolymer of claim 12, also combining at least one external electron donor and organoaluminum.

16. The impact copolymer of claim 12, wherein the impact copolymer has been steamed and dried.

17. The impact copolymer of claim 12, wherein the solid magnesium and halogen-containing titanium compound is made by the method comprising:

(i) a first step of bringing one or two or more compounds selected from phthalic acid ester compounds (1), a magnesium compound and a halogen-containing titanium compound into contact with each other, thereby obtaining a first contact product;

(ii) a second step of further bringing the first contact product obtained in the step (i) and one or two or more compounds selected from diether compounds (2) into contact with each other, thereby obtaining a second contact product, and then washing the obtained second contact product; and (iii) a third step of bringing the washed second contact product and a halogen-containing titanium compound into contact with each other to obtain a contact product, then washing the obtained contact product, and further bringing the washed contact product, one or two or more compounds selected from phthalic acid ester compounds (1) and a halogen-containing titanium compound into contact with each other, thereby obtaining a third contact product.

* * * * *